(12) United States Patent
Fujino et al.

(10) Patent No.: US 6,975,710 B2
(45) Date of Patent: *Dec. 13, 2005

(54) COMMUNICATIONS SYSTEM AND COMMUNICATIONS METHOD

(75) Inventors: Nobutsugu Fujino, Kanagawa (JP); Satoru Chikuma, Kanagawa (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,308

(22) Filed: Dec. 29, 1997

(65) Prior Publication Data

US 2001/0040945 A1 Nov. 15, 2001

(30) Foreign Application Priority Data

May 23, 1997 (JP) ............................................. 9-134185

(51) Int. Cl.[7] ............................................. H04M 11/00
(52) U.S. Cl. ................................. 379/93.09; 379/93.35
(58) Field of Search ........................... 379/90.01, 93.01, 379/93.08–93.09, 93.14, 93.35, 100.09, 100.15–100.16, 110.01, 215.01, 215; 370/462–463, 401, 469; 709/217–219; 395/200.33, 200.47–200.49, 200.57, 200.07, 200.7; 348/15

(56) References Cited

U.S. PATENT DOCUMENTS

| | | | | |
|---|---|---|---|---|
| 4,596,021 A | * | 6/1986 | Carter et al. | ............. 379/93.09 |
| 4,995,074 A | * | 2/1991 | Goldman et al. | ........ 379/93.35 |
| 5,329,578 A | | 7/1994 | Brennan et al. | |
| 5,333,134 A | * | 7/1994 | Ishibashi et al. | ............ 370/462 |
| 5,519,767 A | * | 5/1996 | O'Horo et al. | .......... 379/93.09 |
| 5,546,382 A | | 8/1996 | Fujino | |
| 5,557,658 A | * | 9/1996 | Gregorek et al. | ........... 379/215 |
| 5,699,521 A | * | 12/1997 | Iizuka et al. | ............. 395/200.7 |
| 5,729,594 A | * | 3/1998 | Klingman | ................ 379/93.12 |

(Continued)

FOREIGN PATENT DOCUMENTS

| | | |
|---|---|---|
| EP | 0 774 873 | 5/1997 |
| JP | 64-086660 | 3/1989 |
| JP | 04-180450 | 6/1992 |
| JP | 07-123174 | 5/1995 |
| JP | 07-219866 | 8/1995 |
| JP | 07-236004 | 9/1995 |
| JP | 08-182047 | 7/1996 |
| WO | WO 96/05684 | 2/1996 |
| WO | WO 97/13352 | 4/1997 |
| WO | WO 97/15007 | 4/1997 |
| WO | WO 97/37483 | 10/1997 |

OTHER PUBLICATIONS

German Office Action dated Sep. 20, 2004.

*Primary Examiner*—George Eng
(74) *Attorney, Agent, or Firm*—Katten Muchin Rosenman LLP

(57) ABSTRACT

When voice communications are to be established using the telephone having the telephone number displayed on the application during the data communications, a temporary line disconnection unit disconnects a line being used for the data communications. The application is not notified of this, and the line is connected between the terminal and the telephone. The user on the mobile computer side can voice-communicate with the user of the telephone using the terminal. When the voice communications terminate, the temporary line disconnection unit connects the line between the fixed computer side and the mobile computer side to resume the data communications. Since the application is not notified of the temporary disconnection of the line, the session is set active and the data communications are not started from the very beginning.

16 Claims, 21 Drawing Sheets

U.S. PATENT DOCUMENTS

| | | | | |
|---|---|---|---|---|
| 5,764,278 A | * | 6/1998 | Nagao | 348/15 |
| 5,764,736 A | * | 6/1998 | Shachar et al. | 379/93.09 |
| 5,805,587 A | * | 9/1998 | Norris et al. | 379/215 |
| 5,812,656 A | * | 9/1998 | Garland et al. | 379/215 |
| 5,838,682 A | * | 11/1998 | Dekelbaum et al. | 370/401 |
| 5,841,840 A | * | 11/1998 | Smith et al. | 379/93.09 |
| 5,896,444 A | * | 4/1999 | Perlman et al. | 379/93.35 |
| 5,919,247 A | * | 7/1999 | Van Hoff et al. | 709/217 |

* cited by examiner

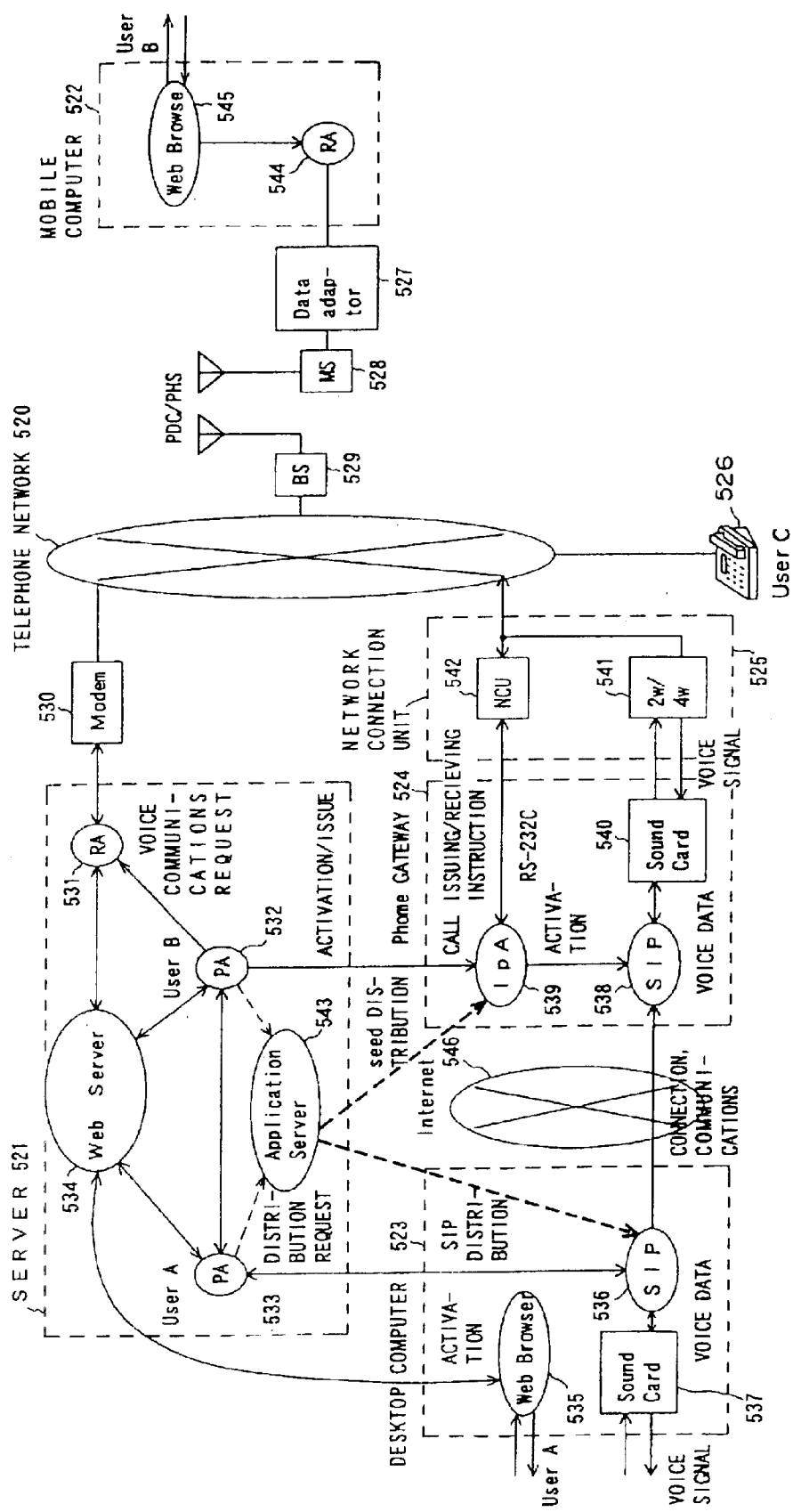
F I G. 3

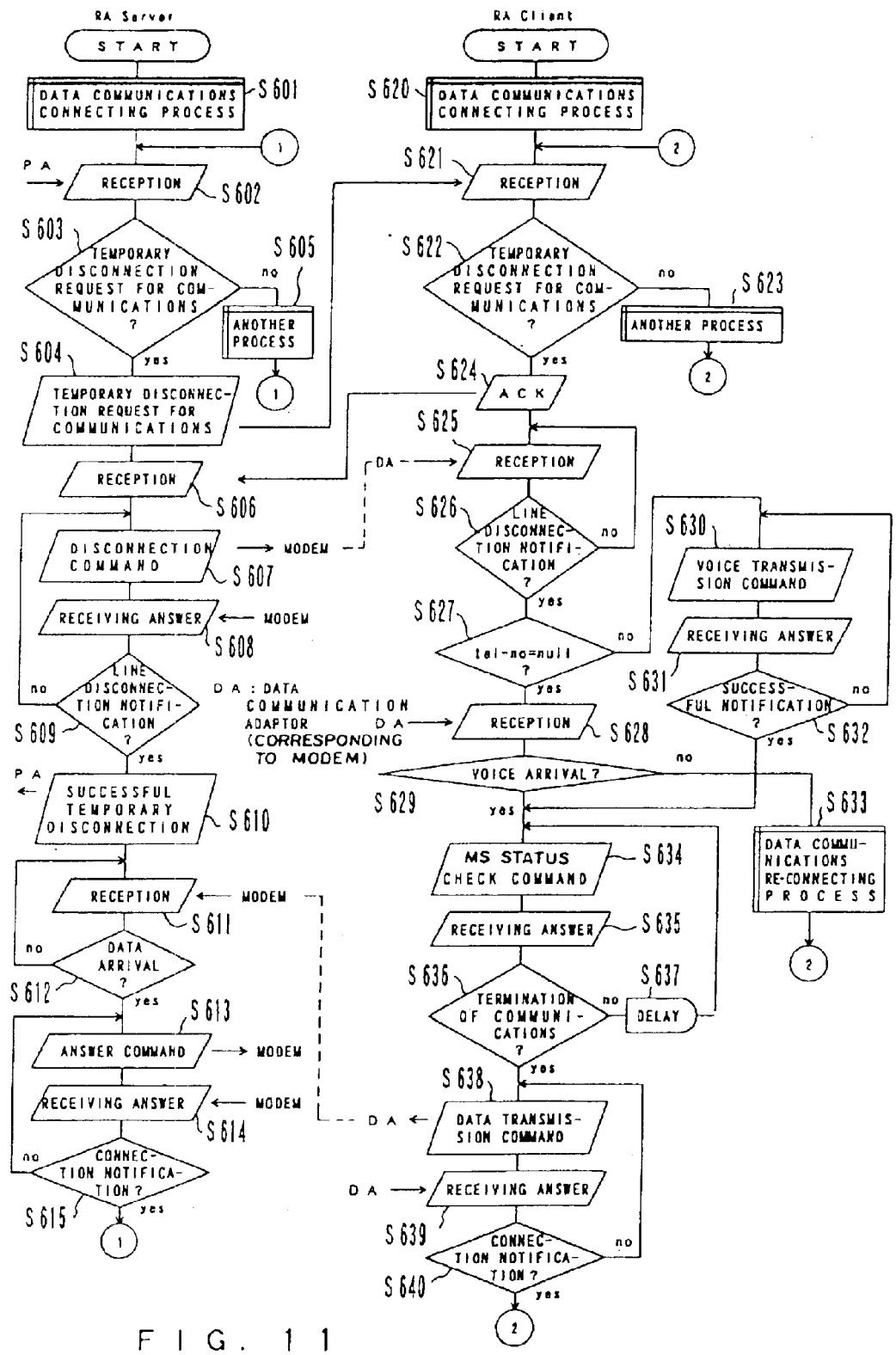
F I G. 11

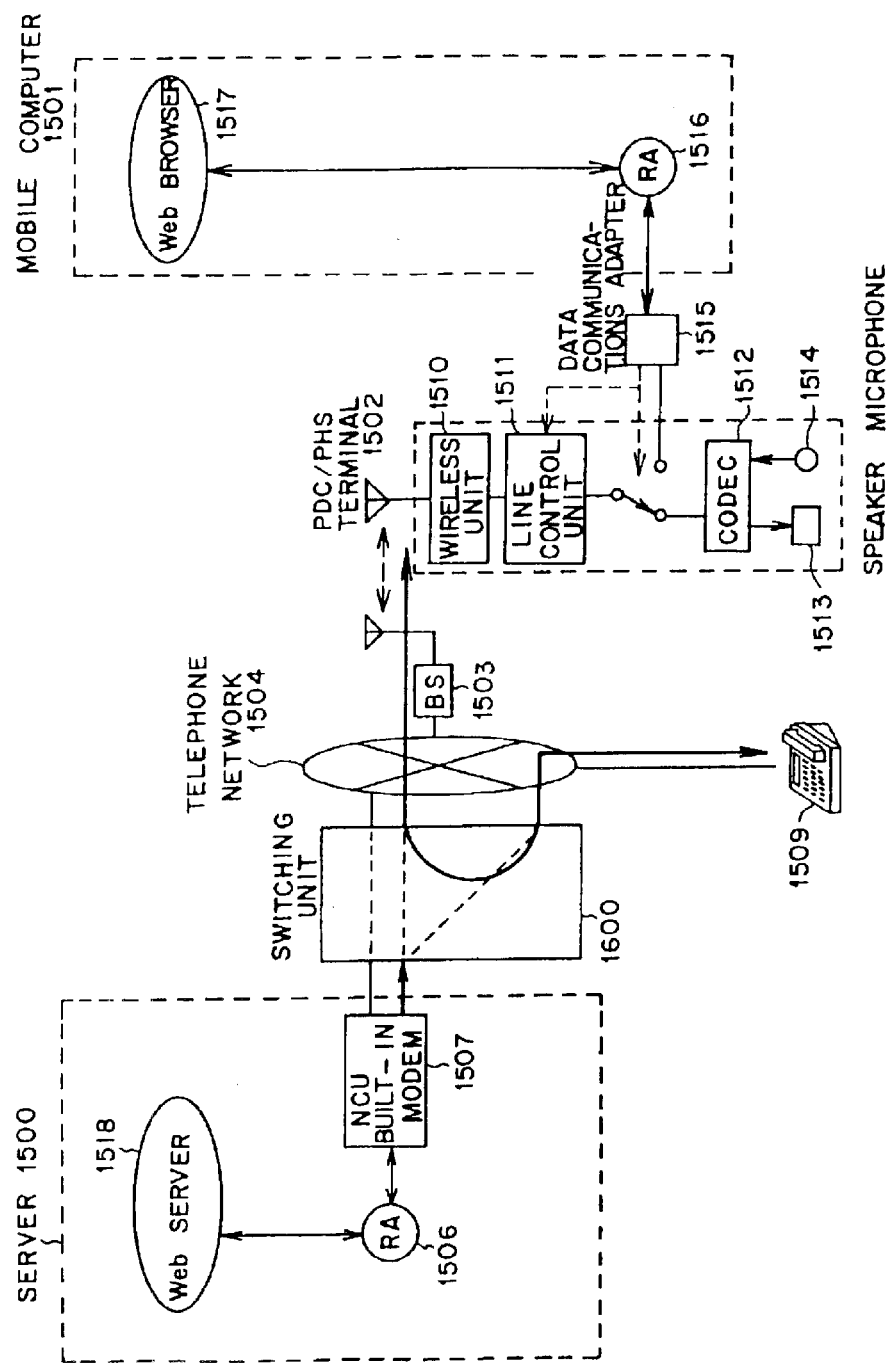
F I G. 17

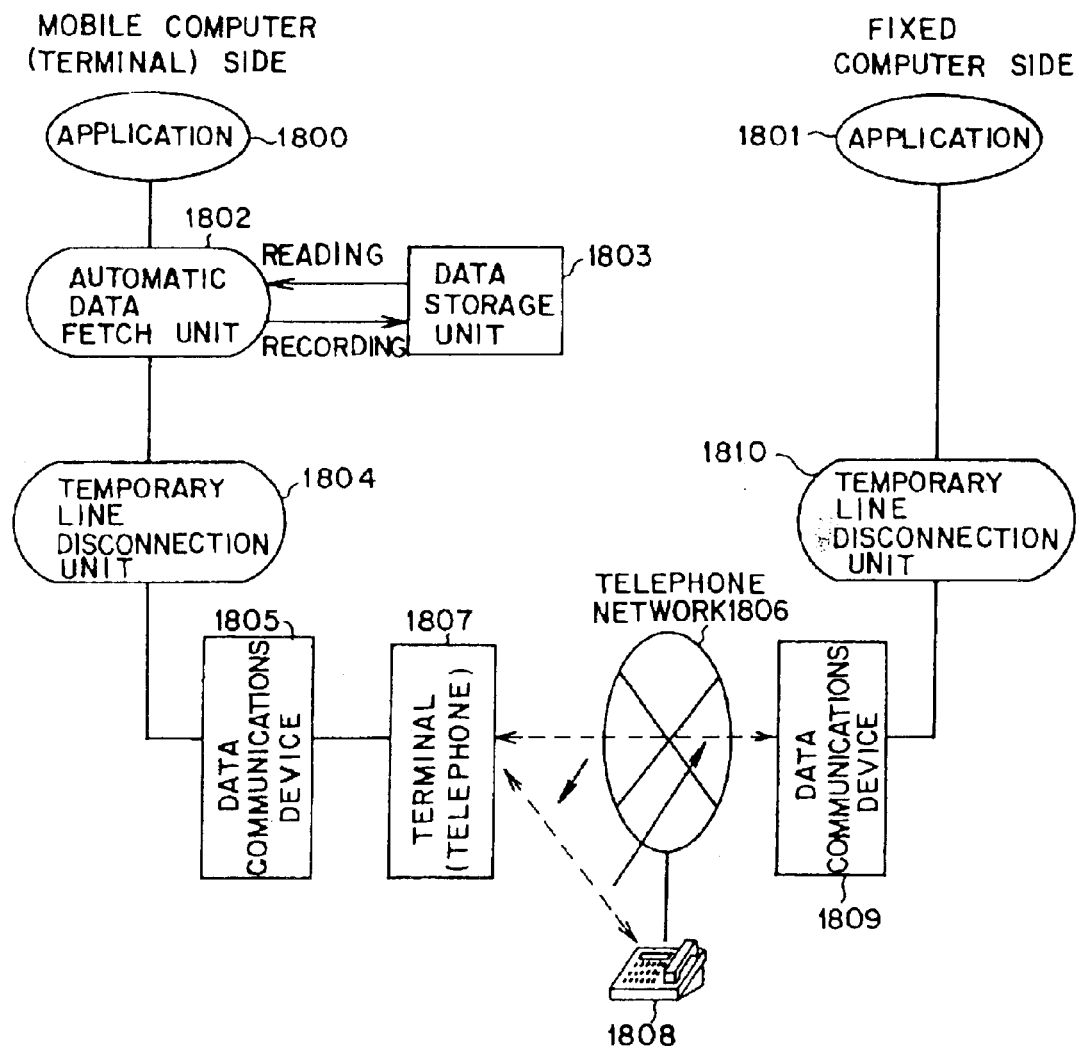
F I G. 19

COMMUNICATIONS SYSTEM AND COMMUNICATIONS METHOD

BACKGROUND OF THE INVENTION

1. Field of the Invention

The present invention relates to a system of establishing voice communications using a telephone during data communications.

2. Description of the Related Art

Recently, users are provided with various communications services after outstanding development of communications technology. Data communication is one of these communications services. In the data communication, a home page of a WWW (World Wide Web) can be seen through a browser using a data communications adapter from a wireless telephone terminal such as a PHS (personal handy-phone system), a PDC (personal digital cellular phone), etc. connected to the Internet through a dial-up connection.

There is a system for satisfying a request from a user to immediately make a phone call according to the information (for example, the telephone number of a shop found during the browsing through Web) obtained during the data communication. A Web server calls up the shop through the CGI (common gateway interface) and connects the user terminal to the shop so that the user can directly communicate with the shop through the phone.

FIG. 1 shows the outline of the conventional communications network system for realizing the function of setting voice communications during data communications.

A server 2100 comprises a switching unit 2105 and is connected to a telephone network 2110 through a switching unit 2105. A personal computer 2101 is connected to the telephone network 2110 through a modem 2108 containing a telephone 2107 and an NCU (network control unit). A telephone 2106 is also connected to the telephone network 2110 through the switching unit 2105 of the server 2100.

A Web server 2102 is implemented in the server 2100, and the Web server 2102 is connected to the switching unit 2105 through a CGI program 2103 or an NCU built-in modem 2104 so that data can be transmitted to the telephone network 2110. A Web browser 2109 is installed in the personal computer 2101, and accesses a home page, etc. provided by the Web server 2102 implemented in the server 2100 through the NCU built-in modem 2108.

In FIG. 1, the line through which the personal computer 2101 accesses the server 2100 is provided separately from the line of the telephone 2107 of the user of the personal computer 2101. The user of the personal computer 2101 sees the home page of the server 2100 on the Web browser 2109. When the user orders goods, the user checks the telephone number of the shop stored on the home page and clicks the mouse button, etc. with the telephone number on the home page pointed to. Thus, the Web server 2102 instructs the CGI program 2103 to call up the user's telephone 2107 and the telephone 2106 of the shop through the switching unit 2105 to connect the user's telephone 2107 to the telephone 2106 and allow the user to communicate with the shop and place an order.

This method is effective if the user has a telephone line separate from the data communications line as shown by the example in FIG. 1. However, the method is not effective when the user uses the same line as a telephone and data communications line. For example, when a personal computer is connected to a portable telephone in a line switching system through a data communications adapter, data communications and voice communications cannot be simultaneously established.

That is, in a line switching network or a packet switching network in which a voice packet cannot be simultaneously processed with a data packet, the line is occupied by the data communications, and no telephone calls can be issued or received.

To make a telephone call, the data communications should be terminated to disconnect the line. In this case, when the data communications are resumed, it is necessary to start the data communications from the very beginning. This is inconvenient to the user.

For example, when a user sees home pages on the Web server and traces various links, the user has to terminate the Web browser and the data communications to disconnect the line before making a telephone call. When the user terminates the telephone call, a line connection should be made to re-establish data communications with the Web server, the Web browser should be set, the Web server should be accessed, and the link should be traced again from the first home page.

SUMMARY OF THE INVENTION

Object of the present invention is to provide means for releasing and receiving a telephone call through the above described communications line without terminating the data communications session during the data communications through a communications line using an existing telephone network, cellular phone network, or a handy portable telephone network.

A further object of the present invention is to provide means for permitting a user to assume that data communications can be set during voice communications even if a communications system does not allow the data communications to be established through the communications line during the voice communications.

The system of the present invention includes a server for providing information; a terminal for communicating data with the server; a communications network for connecting the server to the terminal; and a temporary line disconnection unit for disconnecting a line being used for the data communications without a disconnection notification to an upper layer application of the terminal and the server when the terminal establishes voice communications with the third party other than the server through the communications network during the data communications between the terminal and the server, and for automatically connecting the server to the terminal when the voice communications terminate. With the configuration, when the server and the terminal resume the data communications, the system establishes data communications from the state immediately before the voice communications.

The method of the present invention includes a step (a) of connecting a line between the server for providing information and a terminal for communicating data with the server; and a step (b) of disconnecting a line being used for the data communications without a disconnection notification to an upper layer application of the terminal and the server when the terminal establishes voice communications with the third party other than the server through the communications network during the data communications between the terminal and the server, and for automatically connecting the line between the server and the terminal when the voice communications terminate. With the configuration, when the server and the terminal resume the data communications, the two above described upper layer applications establishes data communications from the state immediately before the voice communications.

According to the present invention, when voice communications are established using a line while data communications are established through the line, the line being used for the data communications is automatically disconnected and a line is newly connected to establish voice communications. Thus, the user can call up the telephone number displayed on a home page through, for example, a portable telephone, etc. When the voice communications terminate, a line is automatically connected to establish data communications. Therefore, the user can immediately resume the data communications. When a line is disconnected to start voice communications, an upper layer application of a mobile computer connected to a portable telephone through a data communications adapter, etc. together with an upper layer application of a server is not notified of the disconnection of the line. Therefore, the sessions of any upper layer applications remain active while the line is disconnected, and the data communications can be immediately resumed when the line for the data communications is reconnected.

Therefore, the user does not have to first terminate the data communications when voice communications are required according to the information obtained in the data communications, and then establish voice communications. It is not necessary to provide two lines for data communications and voice communications to avoid the termination of the data communications to start the voice communications.

BRIEF DESCRIPTION OF THE DRAWINGS

FIG. 3 shows the entire configuration of the system according to the embodiment of the present invention shown in FIG. 2;

FIG. 11 shows the process flow of an RA server and an RA client corresponding to the sequence shown in FIGS. 8 through 10;

FIG. 17 shows an example of the configuration of the system for temporarily disconnecting data communications and establishing voice communications with a user having no function of data communications, and shows the configuration in which a switching unit having the function of 3-member communications is provided separately from a server;

FIG. 19 shows the first example of the configuration of the system for realizing the sequence shown in FIG. 18;

DESCRIPTION OF THE PREFERRED EMBODIMENTS

Figure 1:
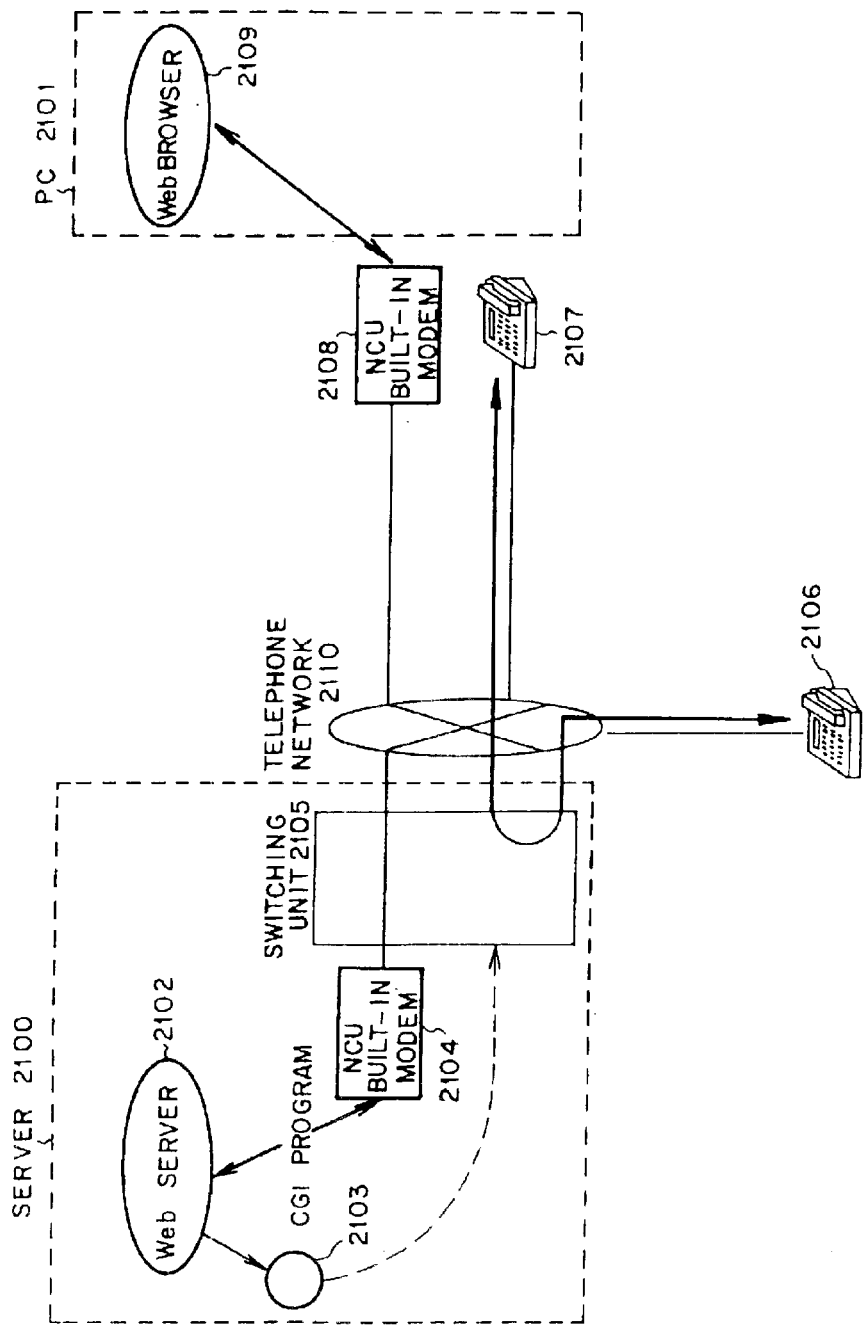
FIG. 1 shows the outline of the configuration of the conventional communications network.
Figure 2:
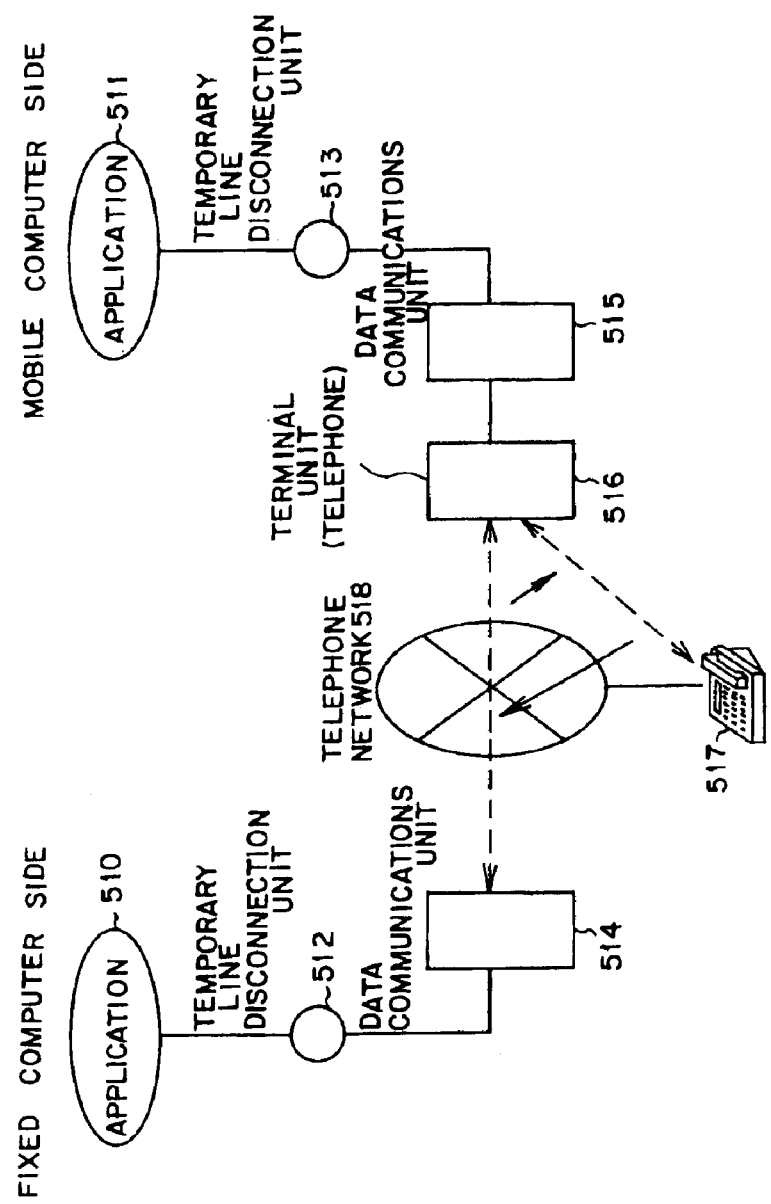
FIG. 2 shows the principle of an embodiment of a system according to another aspect of the present invention.

FIG. 2 shows the principle of an embodiment according to another aspect of the present invention.

In FIG. 2, a fixed computer side refers to a server side, and a mobile computer side refers to, for example, a portable personal computer side, that is, the side on which a user looks into information received from the server.

An upper layer application 510 (Web server, etc.) is installed in the above described server. The server also comprises a temporary line disconnection unit 512 for temporarily disconnecting a data communications line with a communications session of the upper layer application 510 set active under the application. The fixed computer is connected to a telephone network 518 through a data communications unit 514.

An upper layer application 511 of a Web browser, etc. is installed and a temporary line disconnection unit 513 similar to that on the fixed computer side is provided on the mobile computer side. The upper layer application 511 establishes data communications, etc. using a data communications unit 515 and a terminal unit (telephone or portable telephone) 516 through the temporary line disconnection unit 513. On the mobile computer side, the terminal unit 516 is line-connected to a telephone 517 of the third party (for example, a store in which goods are sold) through the telephone network 518 at an instruction from the server, that is, a fixed computer.

With the above described configuration, all lines being used for data communications are disconnected, at a request for issue and acceptance of a call (voice communications) from the mobile computer during the data communications between the fixed computer and the mobile computer, by the temporary line disconnection units 512 and 513 with the sessions of the upper layer applications 510 and 511 set active. At this time, the terminal unit 516 on the mobile computer side is connected to the telephone 517 of the third party through the telephone network 518, and the user on the mobile computer side can voice-communicate with the telephone 517 of the third party using the terminal unit 516. When the communications terminate, a data communications line is connected after the temporary line disconnection unit 513 disconnects the line used for voice communications, and the data communications can be established again between a mobile computer and a fixed computer. At this time, since the sessions of the upper layer applications 510 and 511 are active, the user on the mobile computer can start data communications again from the status of the data communications established immediately before the voice communications (for example, voice communications are established with a home page displayed, and browsing can be resumed from the displayed home page when the voice communications terminates).

When a communications request is received during the data communications between a fixed computer and a mobile computer, the temporary line disconnection units 512 and 513 disconnect a line used for data communications without notifying the upper layer applications 510 and 511. Therefore, the upper layer applications 510 and 511 do not recognize the disconnection of the line. Since the temporary disconnection of the data communications line releases the line which connects the terminal unit 516 to the telephone network 518. Therefore, the mobile computer can issue and receive a call using the terminal unit 516 through the line. When the communication on the phone terminates, the data communications line is connected again to resume data communications. Since the upper layer applications 510 and 511 can continue the data communications, it is not necessary to start the data communications from the beginning.

FIG. 3 shows the configuration of the entire system of the computer network according to the first aspect of the embodiment of the present invention.

The entire system includes the Internet 546 and a telephone network 520 having components respectively connected thereto, and communications can be established between the components. The server 521 for providing a Web page through the Internet 546 comprises a Web server 534 for managing a Web page; an RA (Radio Agent) 531; PAs (Personal Agents) 532 and 533 provided for each user registered in each server 521; and an application server 543 for managing these applications. These programs (agents) can independently operate and perform respective processes by communicating messages with each other.

The RA 531 is a program (agent) for controlling the temporary disconnection of a data communications line with the session of an upper layer application set active. The detailed explanation is given in the specifications of Tokukaihei 7-123174 and Tokuganhei 8-036095. In the specification of the present invention, only the portions relating to the present invention are described, and the explanation of other portions are omitted here. An RA is not provided exclusively in the server 521, but is also provided for a terminal in which data communications and voice communications are independently established by accessing the server 521 as shown in FIG. 3. In FIG. 3, an RA 544 is provided for a mobile computer 522.

The PAs 532 and 533 are programs (agents) provided in the server 521 and control access from a user registered in the server independently for each user. These PAs are provided for each of the users registered in the server. PAs have been standardized recently and a number of relevant patent applications have been filed. Therefore, detailed explanation is omitted here.

In FIG. 3, a phone gateway 524 is connected to the server 521 and the Internet 546, and a network connection unit 525 is connected to the phone gateway 524 and the telephone network 520. The phone gateway 524 and the network connection unit 525 are provided between the telephone network 520 and the Internet 546, and function as switching units.

The phone gateway 524 functions as switching unit for an Internet phone, and comprises an IpA (Internet phone agent) 539, an SIP (secure Internet phone) 538, and a sound card 540. The SIP 538 is a program for establishing voice communications through the Internet 546, that is, a program for utilizing an Internet phone. In this example, SIP is an Internet phone having security capabilities. That is, when an IP datagram is transmitted and received through an Internet phone, the IP datagram is encrypted. Thus, in communications through the Internet which is subject to wire tapping, the communications between users can be successfully secured. Technology related to the SIP is described in the Japanese patent application tokuganhei 8-317505.

The SIP 538 is activated under the control of the IpA 539, and effectuates an Internet phone. That is, the IpA 539 connects and disconnects an Internet phone in the communications process sequence using an Internet phone by, for example, activating an Internet phone upon receipt of an Internet phone use request, etc.

The network connection unit 525 provides the interface between an Internet and a normal telephone line. The network connection unit 525 comprises at lease an NCU 542 and a 2-line/4-line converter (hybrid) 541. The NCU 542 controls communications (transmission and reception of a call control signal) with the telephone network 520. The hybrid 541 converts four communications lines from the sound card 540 into two communications lines for the telephone network 520.

A desktop computer 523, used by a user A through the Internet 546, accesses the server 521. A desktop computer refers not only to a so-called desktop computer, but also to a common computer such as a personal computer, workstation, etc. FIG. 3 shows the status in which the user A at home accesses the server 521 using the desktop computer 523 through the Internet 546.

In the desktop computer 523, a Web browser 535 is installed to view a home page, etc. of the server 521 through the Internet 546. The desktop computer 523 is also provided with a sound card 537 to use an Internet phone. The SIP 536 installed in the desktop computer 523 can be originally installed in the desktop computer 523. In the example shown in FIG. 3, it is distributed from the application server 543 of the server 521 when it is necessary to use an Internet phone. Therefore, the SIP 536 is not required to be preliminarily installed in the desktop computer 523. In the system according to the present embodiment, it is distributed from the server 521 when an Internet phone is used, and automatically installed in the desktop computer 523.

The network connection unit 525 is connected to the telephone network 520. The server 521 is also connected to the telephone network 520 through a modem 530. The modem 530 is designed to be directly controlled by the RA 531 which is a program. The modem 530 is used when data communications line is temporarily disconnected with the session of the Web server 534 set active, to establish voice-communications. It is also used when the server 521 data-communicates with the mobile computer 522.

Furthermore, a base station (BS) 529 of a portable telephone such as PDC/PHS, etc. is connected to the telephone network 520 to communicate a signal for use in data communications or voice communications with a portable telephone 528. The mobile computer 522 is connected to the portable telephone 528 through a data adapter 527. The mobile computer 522 is small enough to be carried by a user B as a small notebook-type personal computer together with the portable telephone 528, and can perform data communications through the Internet 546. A Web browser 545 for viewing a home page of the Web server 534 is installed in the mobile computer 522. The RA 544 similar to the RA 531 is also provided in the mobile computer 522. Since the line used by the mobile computer 522 for the data communications also functions as voice communications line, the RA 544 in cooperation with the RA 531 controls the voice communications to be established during the data communications by the mobile computer 522.

The telephone 526 of a user C is connected to the telephone network 520. The user A or the user B can call up the user C. The telephone 526 is, for example, a telephone to be used by people who have no device for data communications around them in shops, etc.

Figure 4:
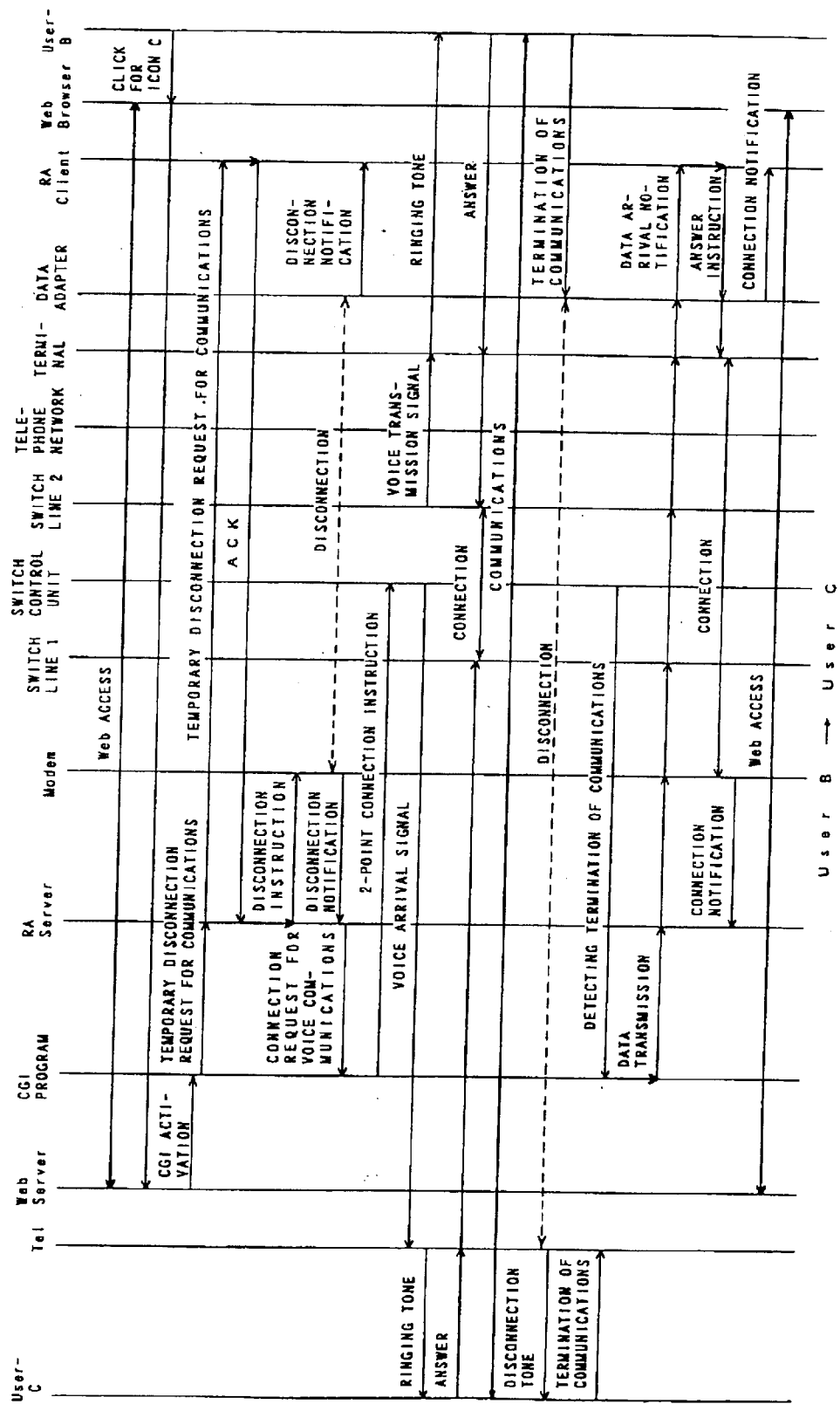
FIG. 4 shows the sequence of the processes performed when a user B shown in FIG. 3 calls up a user C during the data communications with a server.

FIG. 4 shows the sequence of the processes performed when the user B shown in FIG. 3 makes a call to the user C during the data communications with the server 521.

In FIG. 4, the user C refers to a user having the telephone 526 in FIG. 3, and Tel refers to the telephone 526. The Web server and the RA server refer to the Web server 534 and the RA 531 of the server 521 shown in FIG. 3. The CGI program is not shown in FIG. 3, but it is a program implemented in the server 521. The modem refers to the modem 530 shown in FIG. 3. The switch line 1, the switch control unit, and the switch line 2 are not shown in FIG. 3, but refer to switching units provided in the server 521. The telephone network refers to the telephone network 520 shown in FIG. 3. The terminal refers to the portable telephone 528, the data adapter refers to the data adapter 527, the RA client refers to the RA 544, and the Web browser refers to the Web browser 545.

As shown by a bi-directional bold arrow in the top columns in FIG. 4, the user B first accesses the Web server 534 of the server 521 using the Web browser 545 and views the home page. When an icon C of the telephone number to which the user B wants to issue a call is displayed on the home page, the user B clicks the mouse button. Then, the click of the mouse button by the user B for the icon C of the telephone number is notified from the Web browser 545 to the Web server 534. The Web server 534 activates the CGI program. (The CGI program is not shown in FIG. 3. That is, the CGI program is not required in embodying the present invention. However, as described above in the Description of the Related Art, the CGI program has already been popular, the embodiment shown in FIG. 4 shows the sequence of the processes as a result of the execution of the CGI program. When the CGI program is not requested, the case shown in FIG. 4 can be embodied without the CGI program as indicated by the sequence of the processes described later.)

When the CGI program is activated, it requests the RA server (the RA 531 shown in FIG. 3) to temporarily disconnect the line for the voice-communications. Upon receipt of the request, the RA server transmits a temporary line disconnection request to the RA client (the RA 544 shown in FIG. 3) on the user B side. Upon receipt of the acknowledgement (ACK) of the line disconnection from the RA client, the RA server issues a disconnection instruction to the modem 530. Then, lines are disconnected between the modem 530 of the server 521 and the data adapter 527 on the mobile computer 522 side. When the line is disconnected, the data adapter 527 notifies the RA client of the disconnection of the line. However, since the RA client does not transmit a disconnection notification to the Web browser 545 which is an upper layer application, the Web browser 545 cannot recognize the disconnection of the line, but enters a waiting state with the session, in which the line is disconnected, is set active.

When the line of the modem 530 on the server 521 side is disconnected, a disconnection notification is transmitted to the RA server, and a notification that a connection is made for voice communications is transmitted from the RA server to the CGI program. On the server 521 side, a disconnection notification is not transmitted from the RA server to the Web server 534 which is an upper layer application. Therefore, the Web server 534 enters a waiting state with the status (session), in which the line is disconnected, set effective. Upon receipt of a request to make a connection for voice communications from the RA server, the CGI program issues to the switch control unit an instruction to connect two points, that is, to connect the user B to the user C.

The switch line 1 issues a voice reception signal to the telephone 526 of the user C. The telephone 526 outputs a ringing tone. The switch line 2 transmits a voice transmission signal to the portable telephone 528, and the portable telephone 528 outputs a ringing tone. When the user B and the user C answer respective ringing tones, the switching unit connects the switch line 1 to the switch line 2, thereby establishing a voice communications line between the user B and the user C.

The voice communications line is disconnected by the user B's or C's terminating the voice communications. FIG. 4 shows the case in which the user B terminates the communications and a communications termination notification is issued to the data adapter 527. Thus, the voice communications line between the data adapter 527 and the telephone 526 is disconnected, and a disconnection tone is output from the telephone 526. Then, the user C terminates communications by, for example, setting the receiver on the telephone 526. The switch control unit detects the termination of the communications between the users B and C, and notifies the CGI program of the server 521 of the termination. The CGI program transmits data to the RA client. If the RA client receives an arrival notification about the transmitted data from the data adapter 527, and the RA client issues an instruction to receive the data to the data adapter 527, then a connection is established between the modem 530 on the server side and the terminal (portable telephone 528 of the user B), and Web access can be gained between the Web browser 545 on the user B side and the Web server 534 on the server 521 side. At this time, since the Web server 534 and the Web browser 545 do not recognize that the line has temporarily been disconnected for voice communications, the session can continue after the Web access is established again as if the line has never been disconnected. That is, if the mouse button is clicked for an icon on home page with the same home page displayed after the Web access is resumed, then a link is established for the clicked icon as if the Web access has been continued. Thus, new information is transmitted to the Web browser 545.

Figure 5:
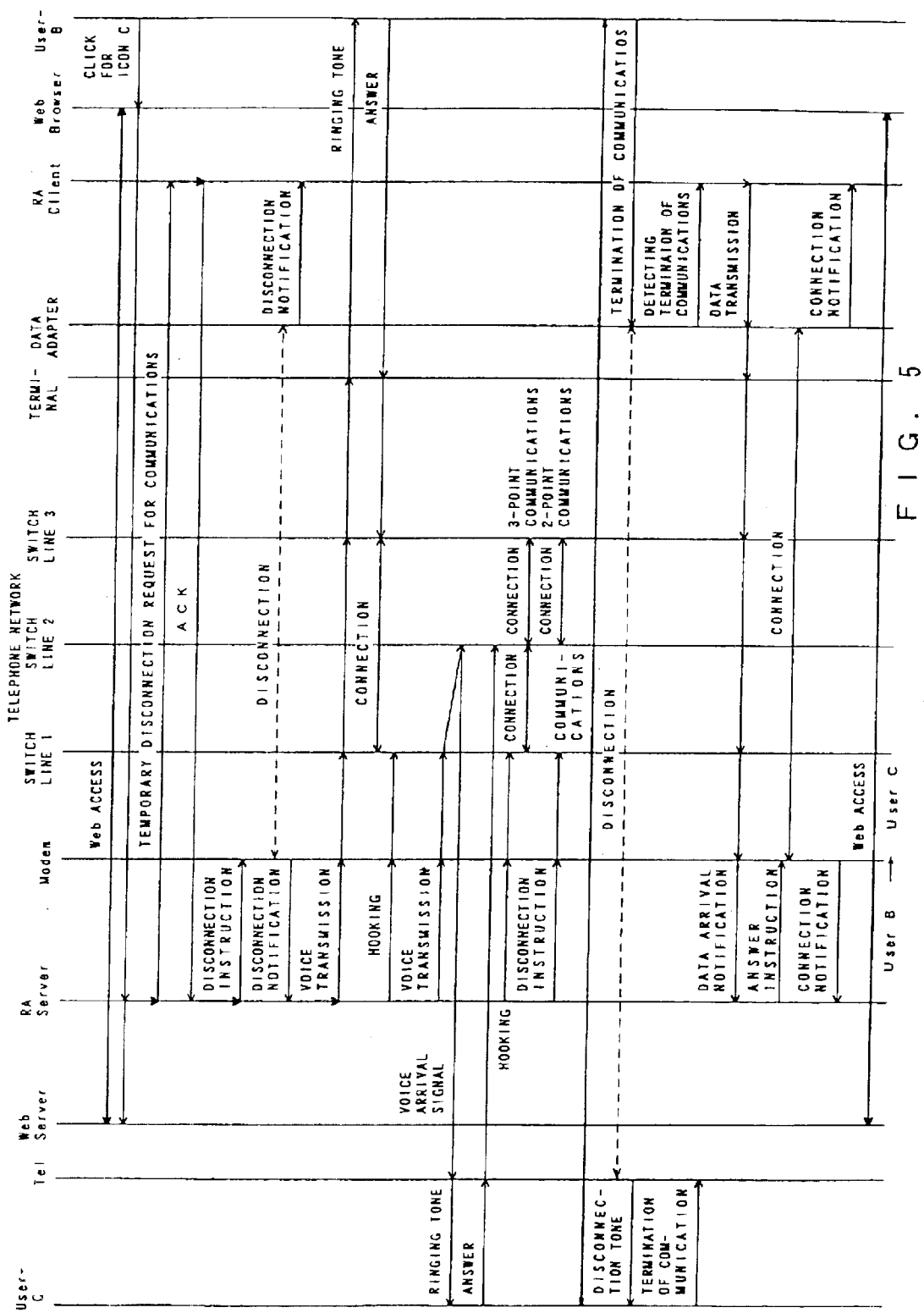
FIG. 5 shows the sequence of the processes performed when voice communications are established between users B and C during the data communications using the 3-party voice communications function of a switching unit provided in a telephone network which is a public network.

FIG. 5 shows the sequence of the processes of establishing voice communications during the data communications between the user B and the user C using the 3-point communications function of the switching unit provided in the telephone network 520.

FIG. 5 shows the sequence of the processes to which the CGI program is not applied. The Tel in the top column in FIG. 5 is the telephone 526 of the user C. The Web server, the RA server, and the modem are provided on the server 521 side shown in FIG. 3 as in FIG. 4. The switch line 1, the switch line 2, and the switch line 3 are switching units provided in the telephone network 520 not shown in FIG. 3. The terminal, the data adapter, the RA client, the Web browser are provided on the user B side shown in FIG. 3 as in FIG. 4.

First, assume that Web access is gained between the Web browser 545 and the Web server 534. When the user B clicks the mouse button for the icon of the telephone number on the home page displayed on the Web browser 545, it is transmitted to the Web server 534 and the RA server (RA 531) notifies the RA client (RA 544) of the request to temporarily disconnect the line for voice communications. If the RA client accepts the request (by issuing an ACK), the RA server transmits a disconnection instruction to the modem 530, and instructs the modem 530 to disconnect the line between the modem 530 and the data adapter 527. Then, a disconnection notification is transmitted from the modem 530 to the RA server, and from the data adapter 527 to the RA client.

Upon receipt of the disconnection notification, the RA server transmits a voice transmission signal to the portable telephone 528. The portable telephone 528 receives a ringing tone. If the user B answers the ringing tone, the switch line 3 connected to the portable telephone 528 of the user B is connected to the switch line 1 connected to the modem 530. Then, the RA server performs hooking. This is the function of a so-called catch-phone. By performing hooking, the server 521 can issue a call to another switch line with the switch line 3 to the portable telephone 528 and the switch line 1 to the server 521 connected. The RA server transmits voice communications to the switch line 2 which is a line to the user C after performing hooking. After transmitting voice, the telephone 526 receives the voice, and a ringing tone is generated in the terminal unit 526. The user C answers the ringing tone, and the switch lines 1 is connected to the switch line 2. When the RA server performs hooking again, the switch lines 1, 2, and 3 are connected to each other, and a 3-point communications line connection is established. When the RA server issues a disconnection instruction for the switch line 1, the switch line 1 is disconnected from the 3-point line connection, and a 2-point line connection is established between the switch lines 2 and 3.

Thus, the user B can establish voice communications for the user C. The voice communications can be terminated by either the user B or the user C. In the case shown in FIG. 5, the communications are terminated by the user B. After the user B terminates the communications, the data adapter 527 disconnects the voice communications line. Thus, the telephone 526 outputs a disconnection tone and the user C terminates the communications by, for example, setting the receiver on the telephone unit.

The data adapter 527 notifies the RA client of the detection of the termination, and the RA client issues data to the RA server through the data adapter 527. Upon receipt of the issued data, the modem 530 issues an arrival notification of the data to the RA server. Upon receipt of the data arrival notification from the modem 530, the RA server issues an instruction to receive the call, thereby establishing a line connection between the modem 530 and the data adapter 527. The modem 530 and the data adapter 527 issue a connection notification to the RA server and the RA client respectively. The RA server and the RA client reestablish the Web access between the Web server 534 and the Web browser 545. Thus, as shown in FIG. 4, the Web access is temporarily disconnected, but the user B gains the Web access to the server 521 as if the Web access has continued.

In FIG. 5, the 3-point communications function of the switching unit of the telephone network 520 is used. If a switching unit is provided on the server 521 side, the 3-point communications function of the switching unit on the server 521 side can be used. No switching units are required on the server 521 side when the 3-point communications function of the telephone network 520 is used. In this case, the number of public lines required on the server 521 side is a half or one-third of the conventional systems, thereby establishing economical advantage.

In FIG. 5, the line of the server 521 is disconnected from the 3-point communications status to establish communications in the 2-point communications status. However, the 2-point communications can be established without a signal tone from the server 521 (modem 530) in the 3-point communications status.

Figure 6:
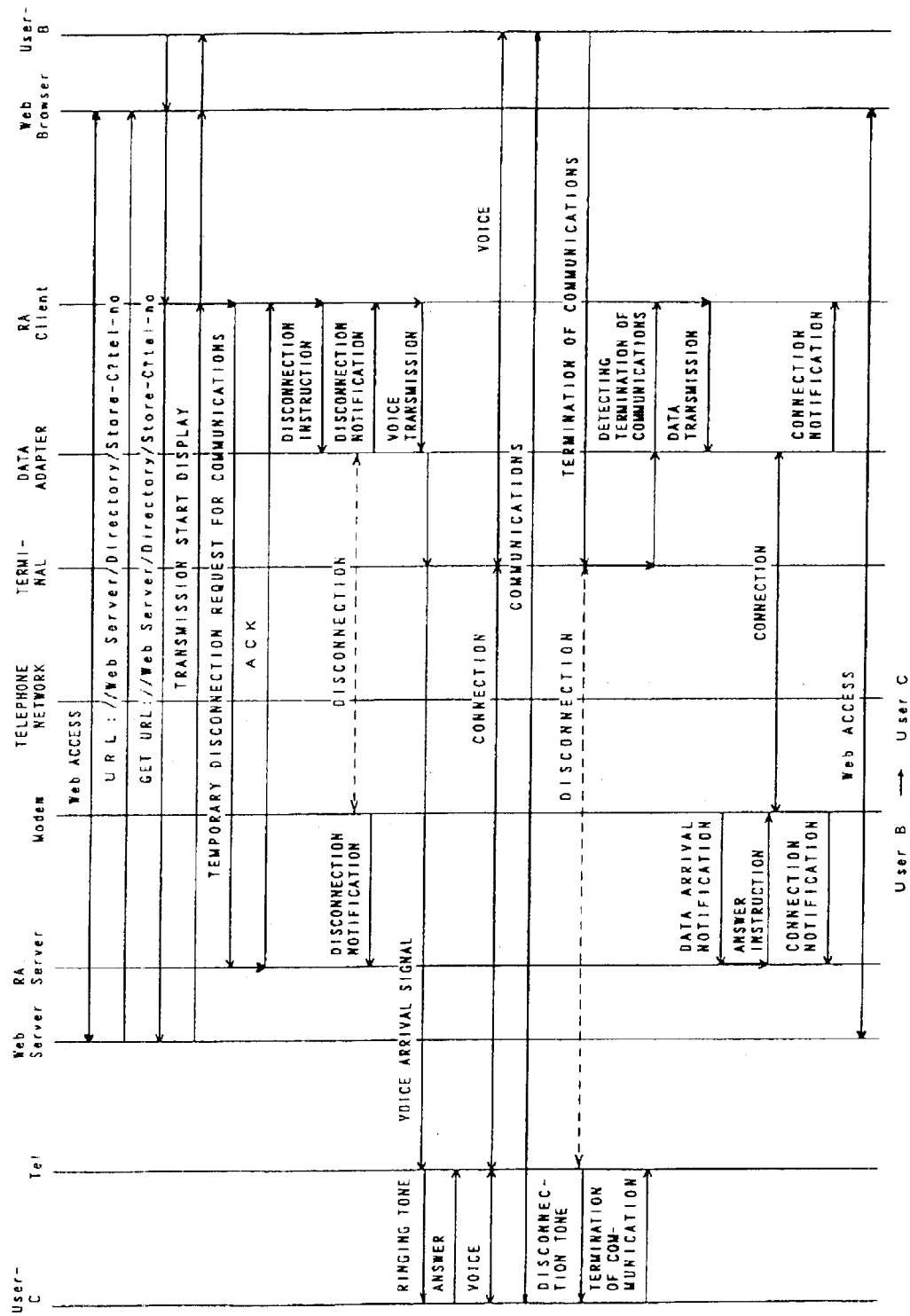
FIG. 6 shows the sequence of the processes performed when voice communications are directly established from a user B side having a terminal (for example, a portable terminal) when the voice communications are established by disconnecting a data communications line.

FIG. 6 shows the sequence of the processes performed when a voice communications connection is directly made on the user B side provided with the portable telephone 528, not on the server 521 side, when voice communications are established with a data communications line disconnected.

First, assume that the Web access has been established between the Web server 534 and the Web browser 545. The user B is informed of the telephone number of the user C (telephone number of the shop in which the user C is located) from the home page displayed on the Web browser 545. When the user B tries to call up the user C, the user B issues to the Web server 534 a request to obtain the address of the shop in which the user C is located. The address contains a special character string, for example, '?tel–no= XXXXXXXX'. When the display is displayed, which informs that a call is to be made to a telephone having the telephone number represented by the special character string, it is displayed on the Web browser 545. The RA client (RA 544) checks the transmitted address. If the above described special character string is contained in the address, the RA client issues a data communications line disconnection request to the RA server. Upon receipt of an acknowledgement from the RA server, the RA client issues a disconnection instruction to the data adapter 527. Thus, the data adapter 527 disconnects the line which connects the modem 530 to the data adapter 527, and the modem 530 and the data adapter 527 issue a disconnection notification to the RA server and the RA client respectively.

Upon receipt of the disconnection notification from the data adapter 527, the RA client transmits a call for voice communications (a voice call) to the telephone 526 through the telephone network 520 based on the telephone number obtained from the above described special character string. On the user C side, the telephone 526 outputs a ringing tone. When the user C answers the call, the telephone 526 on the user C side is connected to the portable telephone 528 on the user B side. The user C starts communications through the telephone 526, and the user B starts communications through the portable telephone 528. Thus, communications are established between the user B and the user C.

When communications terminate, the user B or the user C performs a terminating process (setting a receiver, etc.). In FIG. 6, the user B terminates the communications. When the user B performs the terminating process through the portable telephone 528, the line which connects the telephone 526 to the portable telephone 528 is disconnected, and a disconnection tone is output from the telephone 526. When the user C performs a terminating process, the communications terminate between the user B and the user C. When the RA client detects the terminating process performed by the user B, it issues a data mode call to the RA server through the data adapter 527. Upon receipt of the data mode call from the RA client, the modem 530 issues a data arrival notification to the RA server. When the RA server issues an answer instruction to the modem 530, the line is connected between the modem 530 and the data adapter 527, and the modem 530 and the data adapter 527 issue a connection notification to the RA server and the RA client respectively. Thus, the Web access is re-established between the Web server 534 and the Web browser 545. At this time, since the Web server 534 and the Web browser 545, which are upper layer applications, are not notified of the temporary disconnection, they are in the standby state with the session set active, and can resume the data communications from the state at the point immediately before the disconnection of the line when the Web access is re-established.

Figure 7:
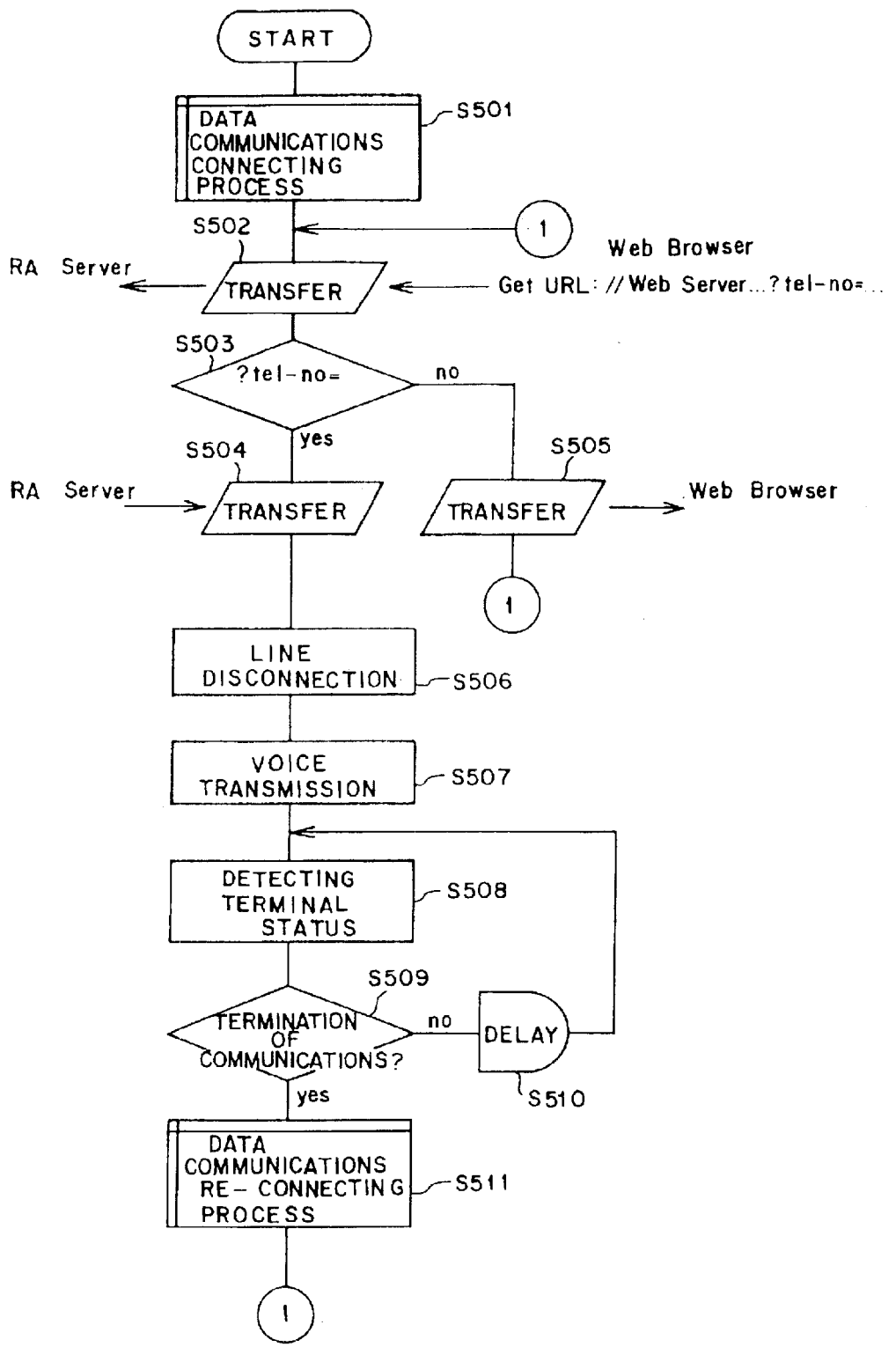
FIG. 7 is a flowchart showing the process specific to the present invention performed by an RA client shown in FIG. 6.

FIG. 7 is a flowchart showing the process of the RA client specific to the present embodiment shown in FIG. 6.

The common configuration and the common process of the RA are described in the above described laid-open publication and the specification of the above described invention. In FIG. 6, the RA 544 (RA client) on the user B side detects a special character string, obtains the destination (user C) telephone number, and transmits voice. This process is newly added by the present embodiment. In the explanation below, the special character string is '?tel–no=', but the special character string is not limited to this form.

The RA client is activated when communications are established through the line switch network (the telephone network 520 in FIG. 3). In FIG. 7, when the RA client is activated, a data communications connecting process is performed in step S501. This corresponds to the process for gaining the Web access to the server 521 on the user B side. Refer to the specification of the above described invention for the process in step S501.

If an instruction is transferred from the Web browser 545 when the Web access is established (in the examples in FIGS. 6 and 7, 'Get URL://WebSerber . . . ?tel—no=. . . '), the RA client transfers the instruction to the RA server (RA 531; step S502). Then, it is determined whether or not the transferred character string contains a special character string (?tel—no=') (step S503). If a special character string is not contained, then processing is passed to step S505, information transmitted from the RA server is transferred to the Web browser 545, processing is returned to step S502, an instruction from the Web browser 545 is awaited, and it is determined in step S503 whether or not an instruction contains a special character string each time an instruction is transferred.

When it is determined that a special character string is contained in step S503, information from the RA server is awaited in step S504. When the information is transmitted, it is transferred to the Web browser 545. A line is disconnected without a notification to the Web browser 545 in step S506, and a voice call is transmitted to the telephone number indicated by the special character string (step S507). Through the transmission of a voice call, communications can be established with the destination identified by the telephone number, and the user B communicates with the destination. During the operation, the RA client detects the status of the portable telephone 528 through the data adapter 527 in step S508, and determines whether or not the communications have terminated (step S509).

If the communications have not terminated, the status of the portable telephone 528 is detected and it is determined again after a short time (step S510) whether or not the communications have terminated. The series of the processes (steps S508 through S510) are repeated until the communications terminate. If it is determined in step S509 that the communications have terminated, it indicates that the voice communications have terminated and the line is available. Therefore, a data communications connecting process is performed (in step S511), processing is returned to step S502, and the following processes are repeated.

Described above are the processes according to the present embodiment, and are more specifically the processes relating to the process sequence shown in FIG. 6. Refer to the above described invention for the start and end of common processes.

Figure 8:
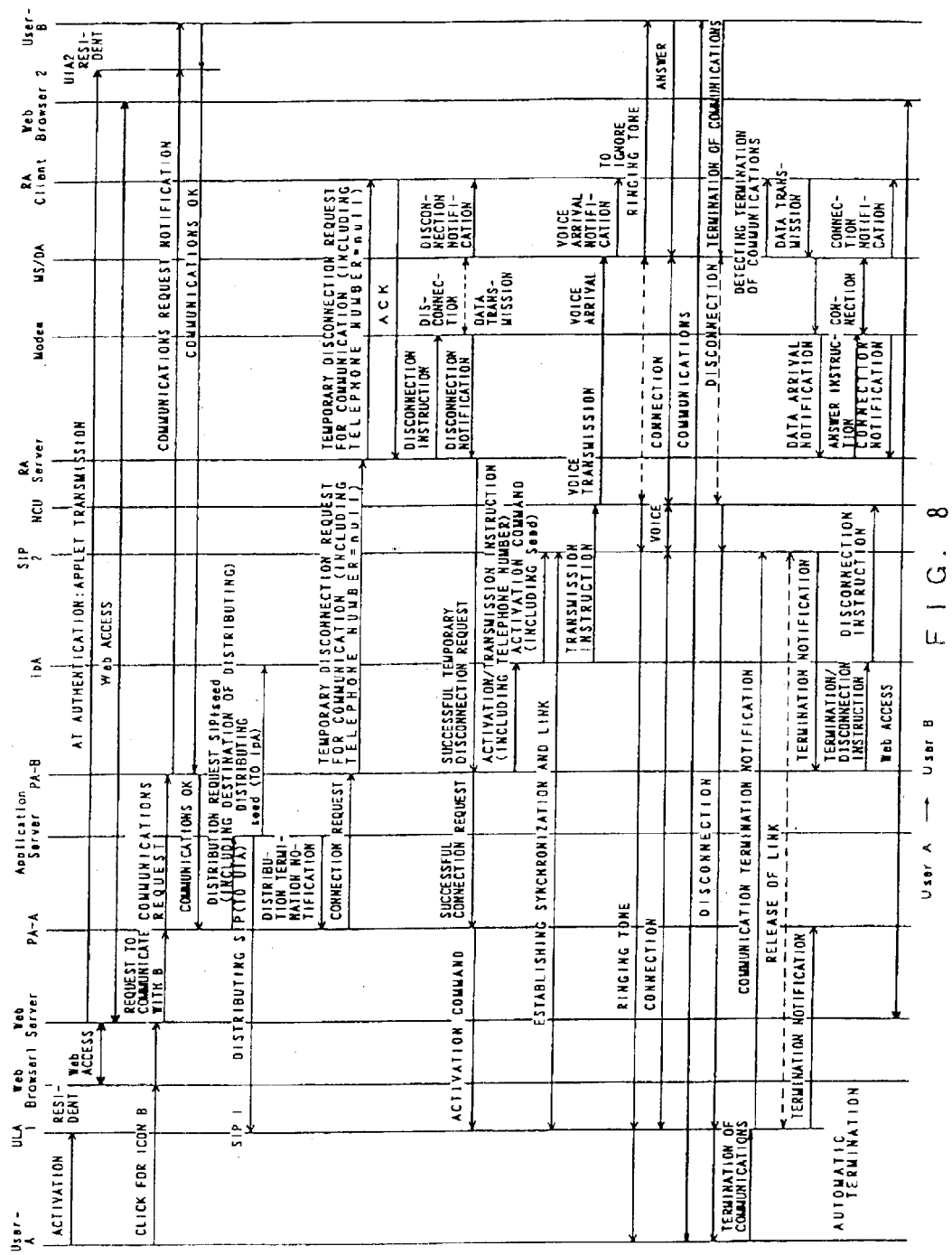
FIG. 8 shows an example of the sequence according to an embodiment of the present invention when means (PA) is provided for each subscriber to manage personal information such as telephone numbers, etc. and communications status at a server side.

FIG. 8 shows an example of the sequence of an embodiment of the present invention when means (PA) for managing personal information such as a telephone number, etc. and a communications status is provided for each user on the server 521 side.

When the correspondence of the items in FIG. 8 to FIG. 3 is checked, the user A and the Web browser correspond to the user A and the Web browser 535 of the desktop computer 523, and Web server, PA-A, the application server and the PA-B correspond to the Web server 534, the PA 533, and the application servers 543 and PA 532 of the server 521. The IpA, the SIP, and the NCU correspond to the IpA 539 in the phone gateway 524, the SIP 538, and the NCU 542 in the network connection device 525. The RA server and the modem correspond to the RA 531 of the server 521 and the modem 530. The MS/DA is a single item referring to a portable telephone 528 and data adapter 527. The RA client corresponds to the RA 544 of the mobile computer 522. The Web browser and the user B correspond to the Web browser 545 installed in the mobile computer 522 and the user B who uses the mobile computer 522. The operations of the PA and the RA are described later.

In the sequence of the processes in FIG. 8, the UIA (User Interface Agent) is used to gain Web access. This is to authenticate the person who receives a service of the present embodiment. The UIA is to be preliminarily installed and resident in the computer (the desktop computer 523 shown in FIG. 3) of an already authenticated person, or to be transmitted as an applet resident to a terminal which tries to gain access when the Web server 534 is accessed, and which is authenticated (for example, using an ID and a password). Thus, a terminal provided with a UIA can gain Web access.

In the case shown in FIG. 8, a UIA 1 is resident in the desktop computer 523 on the user A side to gain Web access to the Web server 534 from the Web browser 535. On the other hand, the user A uses the mobile computer 522, and no authentication is made to gain Web access. When the user B tries to access the Web server 534, it should be authenticated. If access is permitted, the UIA 2 is transmitted as an applet to the mobile computer 522 of the user B and is resident therein. Thus, the user B can gain Web access to the Web server through the Web browser 545.

Next, assume that the user A selects the user B as a possible communicator entered in the home page of the Web server 534. If the user A clicks the mouse button for the icon indicating the user B, the Web server 534 is notified of the selection. The notification informs that the user A requests to communicate with the user B through the PA-A (PA33) which manages the user A. The PA-A notifies the PA-B (PA 32) which manages the user B of the communications request, and informs the UIA 2 resident in the mobile computer 522 that the user A requests the communications with the user B. The UIA 2 displays on the screen of the mobile computer 522 the communications request from the user A to the user B, and prompts the user B for a reply.

When the user B answers that he/she accepts the communications, the UIA 2 informs the PA-B that the communications can be established, and the PA-B informs the PA-A of the same. Upon receipt of the acknowledgement of the communications, the PA-A sends to the application server 543 a distribution request for the SIP program and the seed for encryption. Upon receipt of the request, the application server 543 sends the SIP 536 to the UIA 1 and sends the seed for encryption to the IpA 539.

When the distribution is completed, the application server 543 issues a distribution termination notification to the PA-A. Upon receipt of the distribution termination notification, the PA-A issues a connection request to the PA-B. The PA-B requests the RA server (RA 531) to temporarily disconnect the line for voice communications. The request message does not contain a telephone number. That is, the variable specifying the telephone number is 'null' (In FIG. 8, Tel number=null).

Upon receipt of the disconnection request, the RA server transmits the same request to the RA client (RA 544). If an acknowledgement (ACK) is transmitted from the RA client to the RA server, the RA server transmits a disconnection instruction to the modem 530 to disconnect the connection between the modem 530 and the MS (mobile station, portable telephone) 528. The modem 530 and the MS/DA transmit a disconnection notification to the RA server and the RA client respectively. The RA server notifies the PA-B that a temporary line disconnection request has been successfully accepted, and the PA-B notifies the PA-A that the connection request has been successfully accepted.

After the PA-A receives the notification that the connection request has been successfully accepted, it transmits an activation command to the SIP 536 transmitted to the desktop computer 523 of the user A. At this time, the PA-B sends as an activation/transmission instruction a message containing a telephone number to the IpA 539, and the IpA 539 transmits an activation command containing an encrypting seed to the SIP 538. Thus, the synchronization and link are established through a secure Internet phone between the SIP 536 on the user A side and the SIP 538 of a phone gateway. Furthermore, the IpA 539 issues an instruction to NCU 542 for issuing a call based on the telephone number transmitted from the PA-B. The NCU 542 transmits a voice call to the MS/DA. Upon receipt of the voice call transmitted from the NCU 542, the MS/DA transmits a voice call arrival notification to the RA client, but this is ignored. Upon receipt of the transmitted voice call, the MS/DA outputs a ringing tone.

Simultaneously, the NCU 542 outputs a ringing tone signal to the user A through the secure Internet phone. Thus, the secure Internet phone connects the SIP 536 used by the user A to the SIP 538 in the phone gateway 524. Furthermore, when the user B answers the ringing tone of the MS/DA, the MS/DA is connected to the NCU 542 through a telephone line. The SIP 538 is connected to the NCU 542 in an analog manner to provide the interface between the Internet phone and a normal telephone. Therefore, the user A can start voice communications with the user B.

When the voice communications terminate, either the user A or the user B performs a terminating process. In FIG. 8, the user B performs the terminating process. When the user B transmits a termination instruction to the MS/DA, the voice communications line between the MS/DA and the NCU 542 is disconnected. Thus, the NCU 542 outputs a disconnection tone to the user A through the SIP 538 and the SIP 536. When the user A hears the disconnection tone, the user A instructs the SIP 538 to terminate the communications. At the instruction, the link between the SIP 536 and the SIP 538 is released. When the link is released, the SIP 536 transmits a termination notification to the PA-A, and the SIP 538 transmits a termination notification to the PA-B. After the termination notifications, the SIP 536 automatically terminates.

Upon receipt of the termination notification, the PA-B transmits a termination/disconnection instruction to the IpA 539, and a disconnection instruction is transmitted from the IpA 539 to the NCU 542. Thus, the voice communications between the user A and the user B is completely disconnected. The PA-B issues a termination/disconnection instruction to the IpA 539, and automatically terminates.

Upon receipt of the termination instruction from the user B, the MS/DA notifies the RA client of the detection of the termination of communications. Upon receipt of the notification, the RA client issues a call for data communications (a data call) to the modem 530 through the MS/DA, and a data call arrival notification is transmitted from the modem 530 to the RA server. The RA server instructs the modem 530 to answer the data call, and the modem 530 is connected to the MS/DA through a line. Then, the modem 530 and the MS/DA issues a connection notification to the RA server and the RA client respectively, and the Web access can be established between the Web server 534 and the Web browser 545.

Figure 9:
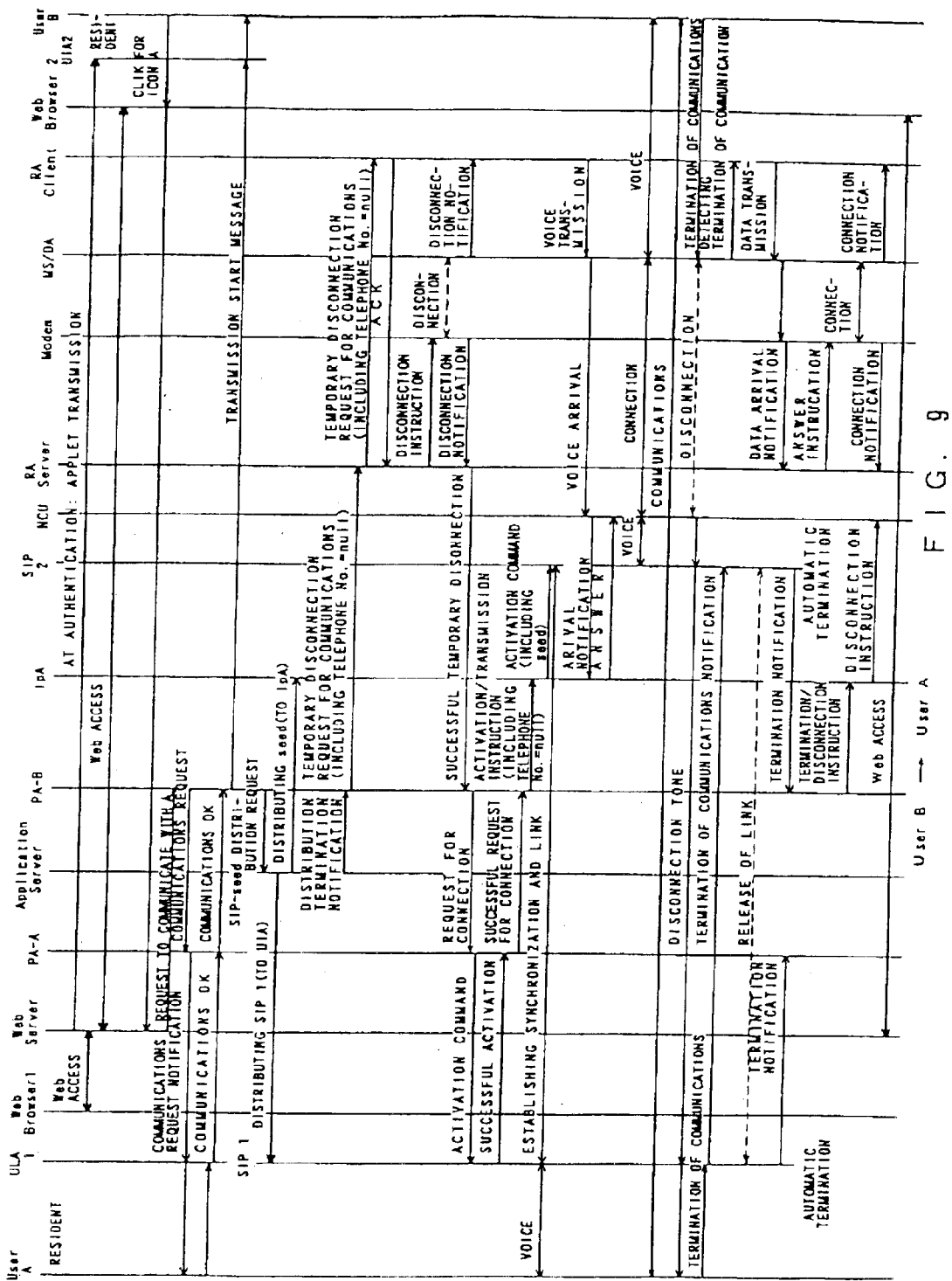
FIG. 9 shows an example of the sequence of connecting a user B having a mobile computer to a user A having a desk top computer.

FIG. 9 shows an example of the process sequence of establishing a connection from the mobile computer 522 side between the user A using the desktop computer 523 and the user B using the mobile computer 522.

The items described in the top columns in FIG. 9 are the same as those shown in FIG. 8. The correspondence between the components shown in FIG. 9 is the same as that shown in FIG. 3, and the detailed explanation is omitted here.

The user A establishes the Web access to the Web server 534 through the Web browser 535. The user B using the mobile computer 522 is checked for authentication before the Web access to the Web server 534. If the user B is authenticated, the UIA 2 is transmitted as an applet, and the UIA 2 is resident in the mobile computer 522. The UIA 2 allows the user B to gain the Web access to the Web server 534 using the Web browser 545.

FIG. 8 shows the case in which the user A requests to establish voice communications with the user B. In FIG. 9, the user B requests to establish voice communications with the user A. Therefore, the user B sees the home page on the Web browser 545, and clicks the mouse button for the icon (icon A) of the user A. Then, the operation information is provided for the Web server 534, and the Web server 534 notifies the PA-B that a communications request is issued from the user B to the user A. Upon receipt of the communications request from the user B, the PA-B transmits a communications request to the PA-A. The PA-A notifies the UIA 1 of the user A of the communications request notification, and the UIA 1 notifies the user A on the display screen that the communications request is received from the user B.

When the user A notifies the PA-A through the UIA 1 that the communications request is accepted, the notification is transmitted from the PA-A to the PA-B. Upon receipt of the communications termination notification, the PA-B notifies the user B that the communications have terminated. On the other hand, upon receipt of the communications termination notification from the PA-A, the PA-B issues to the application server 543 a request to distribute the SIP and a seed for encryption. Upon receipt of the request, the application server 543 distributes the SIP 536 to the UIA 1 of the user A so that the SIP 536 can be resident in the desktop computer 523 of the user A. Furthermore, the application server 543 distributes the encrypting seed to the IpA 539, and then transmits a distribution termination notification to the PA-B.

Upon receipt of the distribution termination notification, the PA-B distributes to the RA server a message containing the telephone number of the user A as a temporary line disconnection request, and requests to disconnect the line connection to the user B. When the request is transferred from the RA server to the RA client, and the RA client returns an acknowledgement notification (ACK) to the RA server, the RA server issues a disconnection instruction to the modem 530. Thus, the connection between the modem 530 and the MS/DA is disconnected. Then, a disconnection notification is transmitted from the modem 530 and the MS/DA to the RA server and the RA client respectively. At this time, since the Web server 534 and the Web browser 545, that is, the upper layer applications, are not provided with a disconnection notification, the sessions of the upper layer applications remain active.

Upon receipt of the disconnection notification, the RA server notifies the PA-B that the temporary line disconnection has been successfully made. Upon receipt of the successful temporary line disconnection notification, the PA-B issues a connection request to the PA-A, and the PA-A transmits an activation command to the SIP 536 according to the connection request. When the SIP 536 is activated, a successful activation notification is transmitted to the PA-A, and the PA-A notifies the PA-B that the connection request has been successfully accepted. Then, the PA-B issues an activation/transmission instruction to the IpA 539, and the IpA 539 transmits to the SIP 538 an activation command containing an encrypting seed, not containing a telephone number. Thus, the synchronization and link can be established between the SIP 536 and the SIP 538 through Internet. The SIP 538 is connected to the NCU 542.

At this time, when a voice call is transmitted from the RA client, the transmitted voice call arrives at the NCU 542 and an arrival notification is issued from the NCU 542 to the IpA 539. At the arrival notification, the IpA 539 answers the NCU 542. As a result, a line is connected between the NCU 542 and the MS/DA, and the user B can voice-communicate with the user A.

When the user A and the user B terminate the voice communications, either of them can issue a communications termination instruction. In FIG. 9, the user B issues the termination instruction. When the user B terminates the communications using the MS/DA, the line between the MS/DA and the NCU 542 is disconnected. When the line is disconnected, the NCU 542 allows a disconnection tone to be output to the user A through the SIP 538 and 536. When the user A performs a communications terminating process on the SIP 536, a communications termination notification is issued from the SIP 536 to the SIP 538. As a result, the link of a secure Internet phone between the SIP 536 and the SIP 538 is released.

When the link is released, the SIP 536 and the SIP 538 transmit a termination notification to the PA-A and the PA-B respectively, and the SIP 536 automatically terminates. The SIP 538 issues a termination notification to the PA-B, and then automatically terminates. Upon receipt of a termination notification from the SIP 538, the PA-B notifies the IpA of the termination/disconnection instruction, and the IpA issues a disconnection instruction to the NCU 542.

On the other hand, when the RA client detects a communications termination, the RA client transmits a data call from the MS/DA. Upon arrival of the data call, the RA server outputs the data to the modem 530, and the line is connected between the modem 530 and the MS/DA. Then, the modem 530 and the MS/DA transmit a connection notification to the RA server and the RA client respectively, and the data communications are resumed between the Web browser 545 and the Web server 534.

Figure 10:
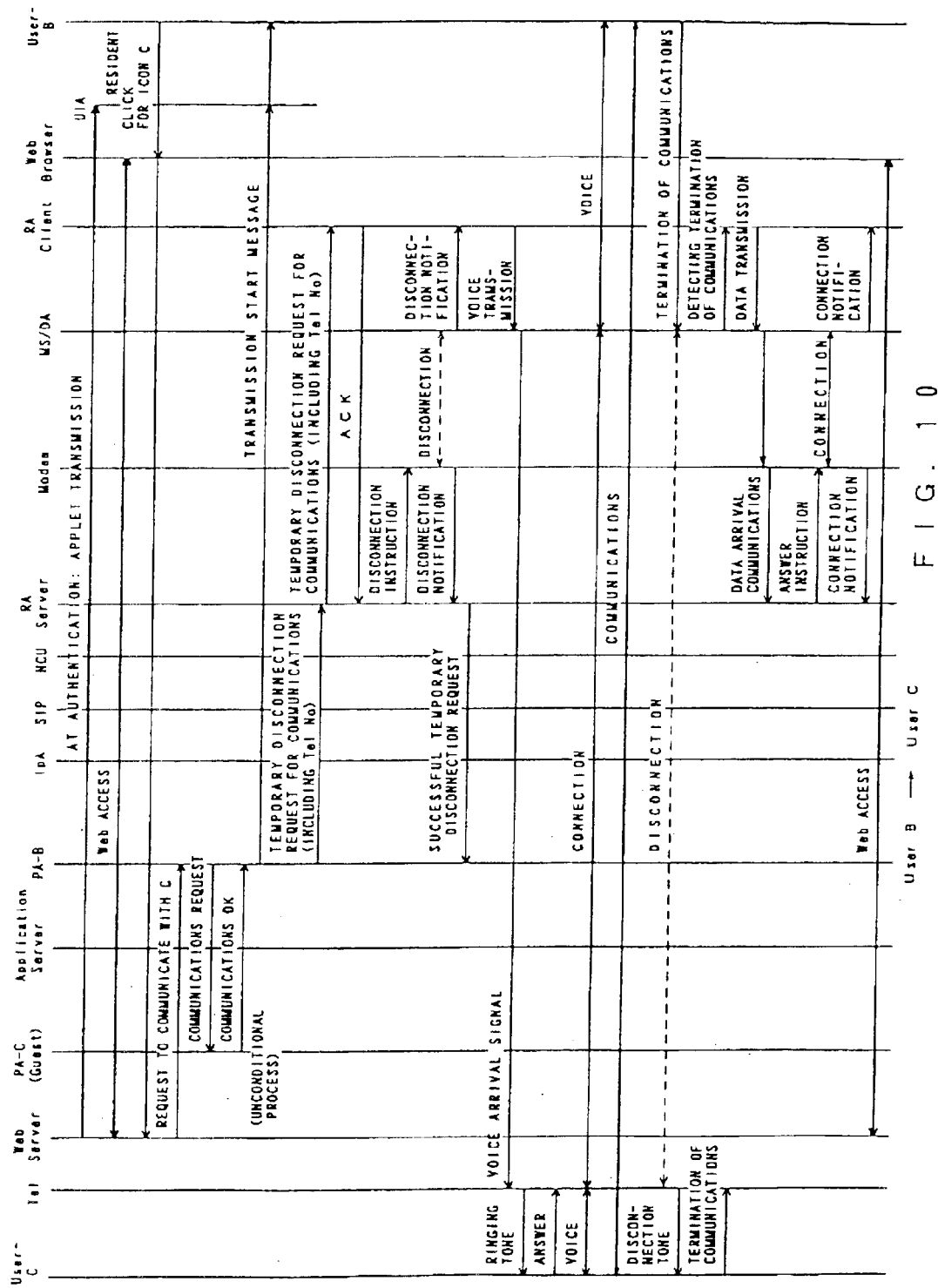
FIG. 10 shows an example of the sequence of calling up a user C having only a normal telephone from a user B having a mobile computer, etc.

FIG. 10 shows an example of the process sequence in which the user B having the mobile computer 522, etc. calls up the user C having only the ordinary telephone 526.

When the user B accesses the server 521, the access is authenticated and user B receives from the server 521 the UIA as an applet to be resident in the mobile computer 522. Thus, the user B establishes the Web access to the server 521 through the Web browser 545. Then, the user B clicks the mouse button on the icon C for communications with the user C. This operation is recognized by the Web server 521, and the Web server 521 notifies the PA-B of the recognition. The PA-B issues to the PA-C a communications request to the user C. The PA-C is called a guest PA. That is, the PA is provided for each person registered in the server 521, and it manages the communications status and personal information. The user C is a normal shop and is not registered in the server 521. Thus, the PA corresponding to the user C not registered in the server 521 does not actually exist. However, the PA-C is provided to control the communications with a non-registered user C.

If the PA-B, registered in the server 521, for managing the personal information and the communications status of the registered user B, issues a communications request to the PA-C for managing the communications status of the non-registered user C, the PA-C unconditionally issues a communications acceptance notification to the PA-B because the user C is not registered in the server 521, has only a normal telephone 526, and it cannot be checked whether or not the user C accepts the communications request.

Upon receipt of a communications request acceptance notification, the PA-B transmits a transmission start message to the UIA on the user B side. The UIA notifies the user B of the transmission start message by displaying it on the screen. Next, to start voice communications, the PA-B transmits to the RA server (RA 531) a temporary data communications disconnection request as a message containing the telephone number of the user C. The RA server transfers this request to the RA client (RA 544). Upon receipt of a disconnection acknowledge (ACK) notification from the RA client, the RA server issues a disconnection instruction to the modem 530, and disconnects the line between the modem 530 and the MS/DA. When the line is disconnected, the modem 530 and the MS/DA transmit a disconnection notification to the RA server and the RA client respectively.

Upon receipt of the disconnection notification, the RA client transmits a voice call to the telephone 526 of the user C based on the telephone number of the user C. Thus, the a voice call arrival signal is transmitted to the telephone 526 of the user C, and a ringing tone is output from the telephone 526 to the user C. When the user C answers the voice call arrival signal by setting the receiver of the telephone 526 off hook, the line is connected between the telephone 526 of the user C and the MS/DA of the user B, thereby establishing voice communications between the users B and C.

When the voice communications terminate (termination by the user B in FIG. 10), the line is disconnected between the telephone 526 and the MS/DA. Thus, a disconnection tone is output from the telephone 526, and the user C performs a terminating process by, for example, setting the receiver of the telephone 526 on hook. When the RA client detects the termination of the communications of the MS/DA, it transmits a data call to the RA server through the MS/DA. Upon receipt of a data call arrival notification from the modem 530, the RA server issues an answer instruction to the modem 530, and establishes the connection of the line between the modem 530 and the MS/DA. As a result, the modem 530 and the MS/DA issue a connection notification to the RA server and the RA client respectively, and re-establishes the Web access between the Web server 534 and the Web browser 545, thereby resuming the data communications from the status at a point immediately before the voice communications starts.

FIG. 11 shows the process flow corresponding to the process sequence shown in FIGS. 8 through 10 of the RA server and the RA client.

First, the RA server and the RA client perform a data communications connecting process for Web access (steps S601 and S620). The RA server receives a message from the PA 532 in step S602, and determines in step S603 whether or not the message contains a temporary line disconnection request for voice communications. If it is not a temporary line disconnection request, another process is performed in step S605, processing is returned to step S602, and a message is awaited from the PA 532. The other process is to be performed at a process request contained in the message from the PA 532. However, it does not directly relate to the present invention, and therefore the detailed explanation is omitted here.

When it is determined in step S603 that the message contains a temporary line disconnection request, a temporary line disconnection request for voice communications is transmitted to the RA client. On the RA client side, after the data communications connection process in step S620, a message is awaited in step S621, and a temporary line disconnection request is transmitted from the RA server. If any message is received in step S621, it is determined in step S622 whether or not the message contains a temporary line disconnection request. If it is not a line disconnection request, a process according to the process request written in the transmitted message is performed in step S623.

If it is determined in step S622 that the message contains a temporary line disconnection request, a message indicating a disconnection acknowledgement (ACK) is transmitted to the RA server in step S624. Upon receipt of the ACK (step S606), the RA server then transmits a line disconnection command to the modem 530 (step S607). Upon receipt of the command, the modem 530 disconnects the line connected to the MS/DA. The DA (Data Adapter) 527 on the mobile computer 522 side transmits to the RA client a notification that the line has been disconnected. After issuing the ACK, the RA client awaits a message in step S625. If any message is received in step S625, it is determined in step S626 whether or not the message contains a line disconnection notification. If it is not a line disconnection notification, processing is returned to step S625, and a message is awaited.

In this case, since the message transmitted from the data adapter (DA) 527 is a line disconnection notification, it is so determined in step S626, and processing is passed to step S627. In step S627, a special character string (for example, ?tel—no=) is retrieved from a disconnection request message received in step S622, and it is determined whether or not the special character string is set as 'null'. If the special character string is set as 'null', then the sequence in FIG. 8 should be followed.

If the special character string is set as 'null', then a message is awaited in step S628, and a notification from the data adapter 527 is awaited. If the special character string is set as 'null', then it indicates that a voice connection is requested by a communicator. Therefore, after receiving any message in step S628, it is determined in step S629 whether or not the message contains a voice call arrival notification. If it is not a voice call arrival notification, then a line is reconnected for data communications in step S633, processing is returned to step S621, and a message from the RA server is awaited. If it is determined in step S629 that a voice call arrival notification has been received, then a status check command is issued in step S634 to check the status of the MS 528 terminal, and whether or not the MS terminal is used for voice communication.

If the special character is not 'null' in step S627, it indicates that a voice call is transmitted on the RA client side as shown in FIG. 9 or 10. Therefore, a voice call transmission command is issued to the MS/DA in step S630, an answer in response to the transmission of a voice call is awaited in step S631, and it is determined in step S632 whether or not a notification indicates that a voice communications line has been successfully connected. If it is not a successful connection notification, processing is returned to step S630, and a voice call transmission command is re-transmitted. If it is determined in step S632 that a successful connection notification has been received, then it indicates that a voice communications line from the RA client has been successfully connected, and the status of the MS terminal is checked and obtained in step S634.

On the RA server side, an answer to a disconnection command is awaited in step S608. When a message is received from the modem 530, it is determined in step S609 whether or not the message contains a line disconnection notification. If it is not a line disconnection notification, processing is returned to step S607, a disconnection command is issued again to the modem 530, and the processes in steps S607 through S609 are repeated until the line is successfully disconnected. If it is determined in step S609 that the message from the modem 530 is a line disconnection notification, then a successful temporary line disconnection notification is issued to the PA 532 in step S610. Then, in step S611, a message is awaited. When a message is received, it is determined in step S612 whether or not the message indicates the arrival of a data call. If it does not indicate the arrival of a data call, processing is returned to step S611 and a data call is awaited.

Thus, the data communications line between the server 521 and the mobile computer 522 is disconnected and a voice communications line is connected. Therefore, the user starts communications through a voice communications line.

On the RA client side, an MS terminal status check command is transmitted to the data adapter 527 in step S634, and an answer to the MS terminal status check command from the data adapter 527 is awaited in step S635. Upon receipt of the answer, it is determined in step S636 whether or not the answer indicates the termination of voice communications. If it does not indicate the termination of voice communications, a process is delayed for a predetermined time in step S637, processing is returned to step S634, an MS terminal status check command is transmitted again to the data adapter 527, and the termination of voice communications is awaited.

When it is determined in step S636 that voice communications terminate, a data transmission command is issued to the data adapter 527 in step S638 to resume the data communications. As a result, the data transmitted from the RA client to the RA server through the telephone network 520 and the modem 530 in step S611 is received. In step S612, the arrival of the data transmitted from the RA client is determined, and processing is passed to step S613.

In step S613, an answer command in response to the arrival of a data call is transmitted to the modem 530, and the answer to the arrival of the data call is issued to the RA client. The modem 530 issues a connection notification to the RA server when the line is connected to the MS/DA on the mobile computer 522 side. The RA server awaits an answer in step S614. If the modem 530 receives any message, it is determined in step S615 whether or not the message contains a connection notification. If it is not a connection notification, processing is returned to step S613, an answer command is transmitted again to the modem 530, and the processes in steps S613 through S615 are repeated until a connection is established. If it is determined in step S615, it indicates that a data communications line is connected, and processing is returned to step S602 to await a message from the PA 532.

On the RA client side, an answer to the data transmission is awaited in step S639 after step S638. When a message is received from the data adapter 527, it is determined in step S640 whether or not the message is a connection notification. If it is not a connection notification, then processing is returned to step S638 and a data transmission command is issued again, and the processes in steps S638 through S640 are repeated until a data communications line is connected. If it is determined in step S640 that a connection notification has been transmitted, then it is recognized that a data communications line has been connected again to the server 521, and processing is returned to step S621 and a message from the RA server is awaited.

Described below is the PA.

Figure 12A:
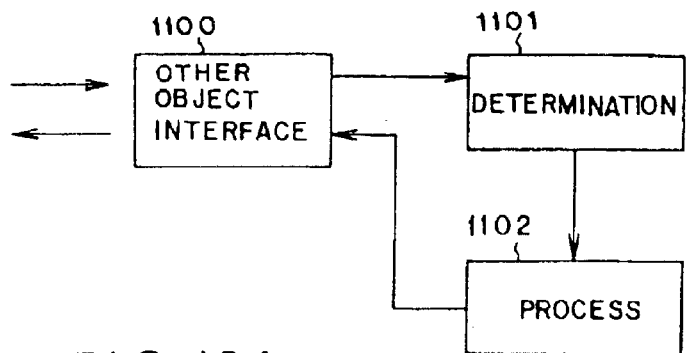
FIGS. 12A and 12B show the outline of the program configuration and the common process flow of a PA.
Figure 12B:
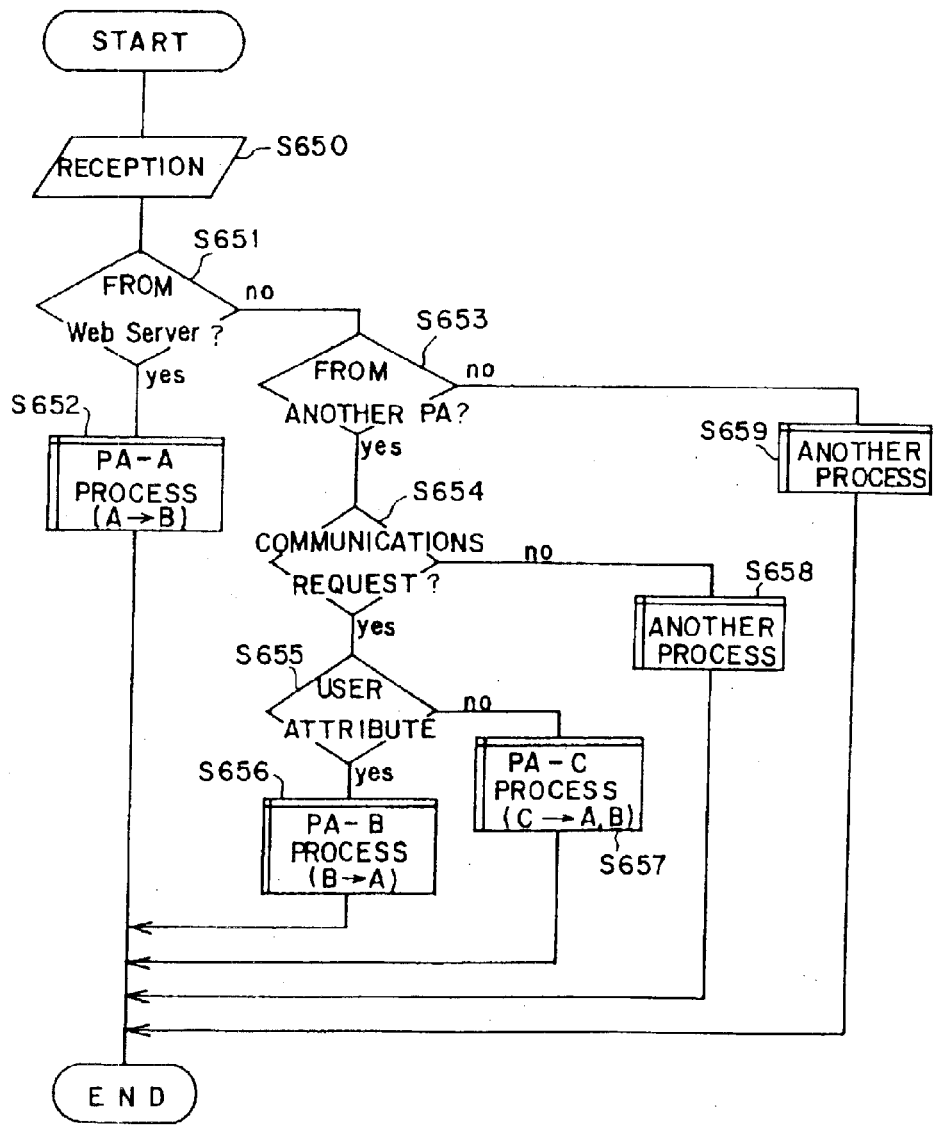

FIGS. 12A and 12B show the configuration of a general program and a common process flow of the PA.

As shown in FIG. 12A, the PA comprises about three blocks. That is, the PA is designed as an agent or an object operating independently. Since it operates while communicating messages with other objects, it requires an interface. Therefore, the PA is provided with an interface 1100 as an interface with another object. A message received by the interface 1100 is interpreted by a determination unit 1101, and the contents of the message is determined. When the contents are determined, a process corresponding to the contents determined by a process unit 1102 is performed, and the process unit 1102 transmits its process result to another object or an agent through the interface 1100 by means of a message.

As shown in FIG. 12B, a message (local packet) is awaited in step S650 in the process flow of the PA. If a message is received in step 650, it is determined whether or not the message is received from the Web server 534 (step S651). If it is a message from the Web server 534, then a PA-A (PA 533) process, described later, is performed in step S652. If it is not a message from the Web server 534, then it is determined in step S653 whether or not it is a message from another PA. If it is not a message from another PA, a process corresponding to the message is performed in step S659.

If it is a message from another PA, it is determined in step S654 whether or not the message contains a communications request. If the message does not contain a communications request, a process corresponding to the message is performed. A process corresponding to a message does not directly relate to the present invention, and therefore the detailed explanation is omitted here. If it is determined that the message contains a communications request in step S654, it is determined whether or not an attribute, corresponding to the user, for use in communications control according to the communications request transmitted from the server 521 exists. If a user attribute exists, a PA-B (PA 532) process described later is performed. If a user attribute does not exist, then a PA-C (guest PA) process described later is performed, thereby terminating the process.

FIG. 13 is a flowchart showing the PA-A and PA-B processes.

Figures 13A, 13B:
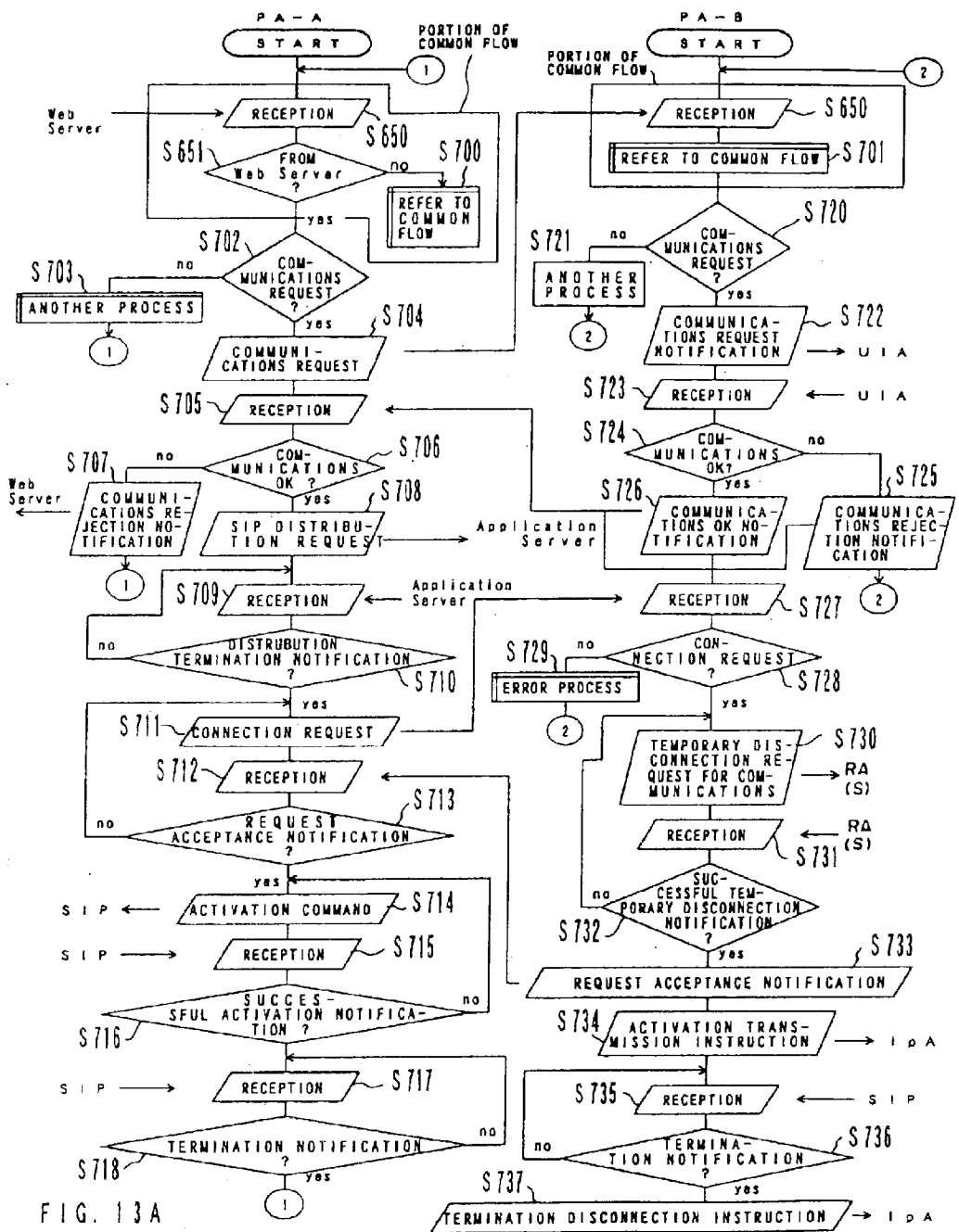
FIG. 13 is a flowchart showing the process of a PA-A and a PA-B.

The PA-A refers to the PA for controlling communications when a management user is in a position to use an Internet phone by such as the desktop computer 523. On the other hand, the PA-B refers to the PA for controlling communications when a user to be managed is in a position to gain Web access to, for example, the mobile computer 522, etc., but not to use an Internet phone. FIG. 13A shows the PA-A process; and FIG. 13B shows the PA-B process. Steps S650, S651, and S700 in FIG. 13A show a portion of the common flow shown in FIG. 12B. The processes assigned the same numbers indicate the common flow shared between FIGS. 13A and 13B. The common portion in step S700 in FIG. 13A and step S701 in FIG. 13B is abbreviated. For details, refer to the common flow shown in FIG. 12B.

In the PA-A process shown in FIG. 13A, processing is passed from a portion of the common flow to the determination in step S702. In step S702, it is determined whether or not the message (local packet) from the Web server 534 contains a communications request. If it is not a communications request, then another process is performed in step S703, and processing is returned to the start of the portion of the common flow. Another process refers to a process according to a message. However, since it does not directly relate to the present invention, the detailed explanation is omitted here.

If it is determined in step S702 that the message contains a communications request, a communications request is issued to the PA (PA-B in the case shown in FIGS. 13A and 13B) which is managing the communications destination in step S704. Next, in step S705, a message from the PA which issued the communications request is awaited. When a message is received, it is determined in step S706 whether or not the message indicates the acknowledgement of the communications. If the communications are not accepted, a communications rejection notification is transmitted to the Web server 534 in step S707, and processing is returned to the start of the portion of the common flow.

If the message indicates the acceptance of communications in step S706, an SIP distribution request is issued to the application server 543 in step S708. Then, a message from the application server 543 is awaited in step S709. When a message is received, it is determined in step S710 whether or not the message contains a distribution termination notification. If it is not a distribution termination notification, processing is returned to step S709 and the same processes are repeated until a distribution termination notification is transmitted from the application server 543.

If the message from the application server 543 contains a distribution termination notification in step S710, then a connection request is transmitted to the PA (PA-B in the case shown in FIGS. 13A and 13B) for managing a connected-to (destination) user in step S711. In step S712, a message from the PA for managing a connected-to user is awaited. When the message is received, it is determined in step S713 whether or not the message indicates that the connection request has been successfully accepted. If the connection request is not accepted, the processes in steps S711 through S713 are repeated until the connection request is accepted. If it is determined that the connection request has been successfully accepted in step S713, an activation command is transmitted in step S714 to the SIP 536 distributed in step S708. Then, in step S715, a message from the activated SIP 536 is awaited. When a message is received, it is determined in step S716 whether or not the message is a successful activation notification indicating the SIP 536 has been successfully activated. If the SIP 536 has not been successfully activated, processing is returned to step S714, and the processes in steps S714 through S716 are repeated until the SIP 536 is activated. If it is determined in step S716 that a successful activation notification has been received, then processing is passed to step S717 and a communications termination message from the SIP 536 is awaited. When any message is received from the SIP in step S717, then processing is passed to step S718, and it is determined whether or not the message is a communications termination notification. If it is not a termination notification, processing is returned to step S717 and the processes are repeated until the termination notification is transmitted from the SIP 536. If it is determined in step S718 that a termination notification has been transmitted, processing is returned to the start of the common flow and a series of the processes terminate.

In the PA-B process, it is determined whether or not the received message is a communications request after the common flow as shown in FIG. 13B. If it is not a communications request, another process is performed in step S721 according to the message and processing is returned to the start of the common flow. If the message is a communications request, then a communications request notification is transmitted to the UIA of the mobile computer 522 of the user B managed by the PA-B. Then, a message from the UIA is awaited in step S723.

When a message is received from the UIA in step S723, it is determined in step S724 whether or not the message indicates the acknowledgement of the communications. If the message is not a communications acknowledgement message, a communications rejection notification is transmitted to the PA (PA-A in the case shown in FIGS. 13A and 13B) in step S725, and processing is returned to the start of the portion of the common flow. If it is determined in step S724 that the message indicates the acknowledgement of the communications, then a communications acknowledgement notification is transmitted to the PA (for example, PA-A) which has transmitted the communications request.

Then, a message from the PA which has transmitted the communications request in step S727 is awaited. When a message is received, it is determined in step S728 whether or not it is a connection request. If it is not a connection request, then it indicates that a connection request has not been transmitted from the PA which has issued the communications request, an error process is performed in step S729, and processing is returned to the start of the common flow in preparation for the subsequent process. If it is a connection request, a request to disconnect a line for voice communications is output to the above described RA (RA server) in step S730. In step S731, an answer from the RA is awaited. When an answer message is received from the RA, it is determined in step S732 whether or not the line has successfully been disconnected. If the line has not been successfully disconnected, then processing is returned to step S730 and the processes are repeated until the line is successfully disconnected. If it is determined that the line has been successfully disconnected, then the PA (PA-A in the case shown in FIGS. 13A and 13B) which has transmitted the communications request is notified that the line has successfully been disconnected.

In step S734, an activation transmission instruction is issued to the IpA 539, and a synchronization and link are established between the user who has transmitted the communications request through the SIP 536 and the SIP 538 of the phone gateway 524. Then, the PA-B awaits a termination notification message of the communications (communications through a secure Internet phone with the user who has transmitted the communications request) from the SIP 538 of the phone gateway 524 (step S735). If the message received in step S736 is not a termination notification, then processing is returned to step S735 and the processes in steps S735 and S736 are repeated until a termination notification is transmitted. If it is determined in step S736 that a termination notification has been transmitted, then a termination disconnection instruction is transmitted to the IpA 539 in step S737, and processing is returned to the start of the portion of the common flow, thereby terminating a series of the processes.

Figure 14:
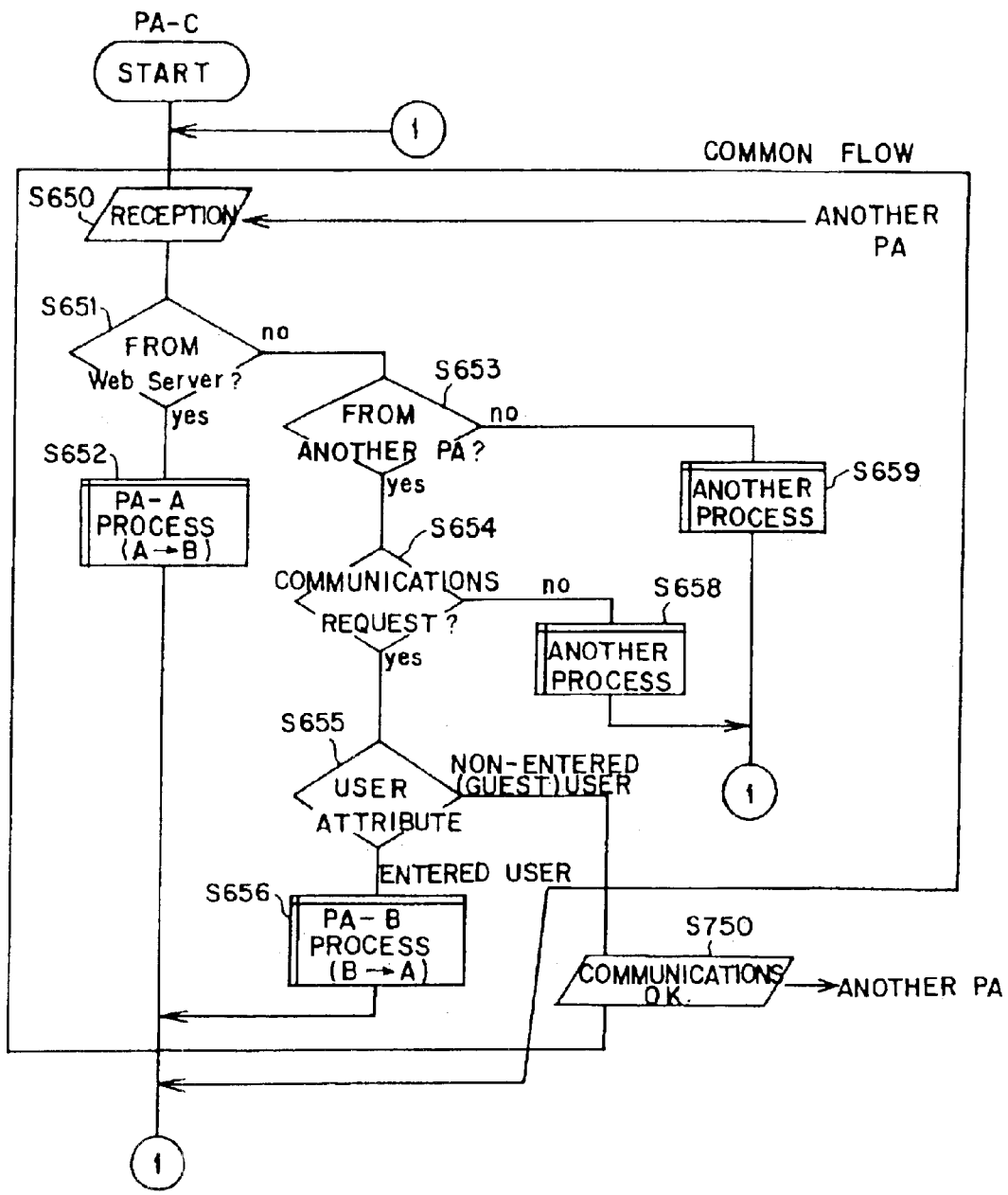
FIG. 14 is a flowchart showing the guest PA for managing the communications with a user not registered in the server.

FIG. 14 is a flowchart showing the processes of the guest PA for managing the communications with a user not registered in the server.

The PA-C (guest PA) process shown in FIG. 14 is almost the same as the common flow shown in FIG. 12B. Corresponding steps in these figures are assigned the same step number. However, in the message reception step S650 in the PA-C process, no messages are transmitted from the Web server 521, but messages are transmitted only from other PAs. Therefore, steps S651, etc. are not required, but they are provided to show the configuration of the PA functioning as any of the PA-A, PA-B, and PA-C.

Therefore, when the PA functions as a guest PA (PA-C), a message is transmitted from another PA in step S650. Processing is passed to the process in step S654, and it is determined whether or not the message contains a communications request. If it is not a communications request, then another process in step S658 is performed, and then processing is returned to the start of the common flow, thereby terminating a series of the processes. On the other hand, if the message contains a communications request, then it is determined whether or not the user attribute of the present PA is registered. If it is a registered user, then the PA-B process in step S656 is performed. If the user attribute is not registered, and the user is found to be a non-registered user, then a communications acknowledgement notification is unconditionally transmitted in step S750 to the PA which has transmitted the message. Then, processing is returned to the start of the common flow, thereby terminating a series of the processes and entering a process standby state. The communications acknowledgement notification is unconditionally issued for the reasons described by referring to FIG. 10.

Figure 15:
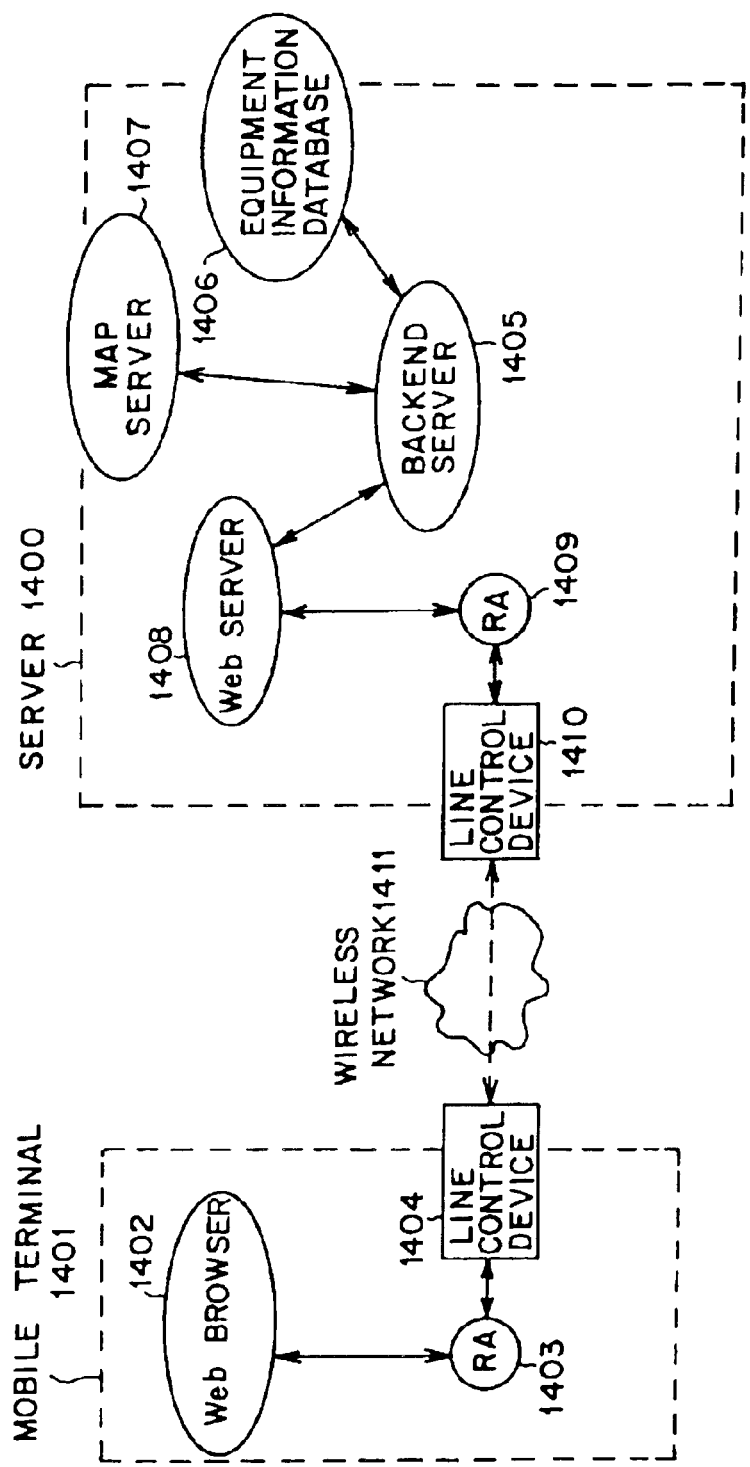
FIG. 15 shows the outline of the configuration for providing information such as a telephone number, etc. of the third party for the user who is accessing the server.

FIG. 15 shows the outline of the configuration for providing the user accessing a server with the information such as the telephone number, etc. of the third party.

Assume that the user accessing a server 1400 is using a mobile terminal 1401. A Web browser 1402 is installed in the mobile terminal 1401. The mobile terminal 1401 accesses the server 1400 through a wireless network 1411 using an RA 1403 (RA client) and a line control device 1404. The server 1400 is provided with a line control device 1410 and an RA 1409 (RA server), and a Web server 1408 provides information through them. At this time, the information such as a database, etc. can be utilized to carry various information on the home page of the Web server 1408. In FIG. 15, a map server 1407 and a equipment information database 1406 are provided as examples of the database.

The map server 1407 is used to display the position of a shop with a map for a user. By arranging icons of shops on the map, and clicking the mouse button for an optional icon, various information of a shop can be referred to. In this case, the equipment information database 1406 is utilized. The equipment information database 1406 provides the information required for the shop, for example, the address, the telephone number, etc. of the shop.

Thus, when a home page is displayed on the Web server 1408 using various databases, a server is required to totally manage the databases and associate data of one database with data of another database. This is a backend server 1405. The backend server 1405 totally manages the Web server 1408, the map server 1407, and the equipment information database 1406, associates data retrieved from the equipment information database 1406 with other data, and displays the data on the home page of the Web server 1408.

With the configuration, the server 1400 can provide the user of the mobile terminal 1401 with various information as graphical data. Particularly, as described above, an icon of the telephone numbers of shops is displayed on the home page. When the user of the mobile terminal 1401 clicks the mouse button for the icon, the shop is called up.

Figure 16:
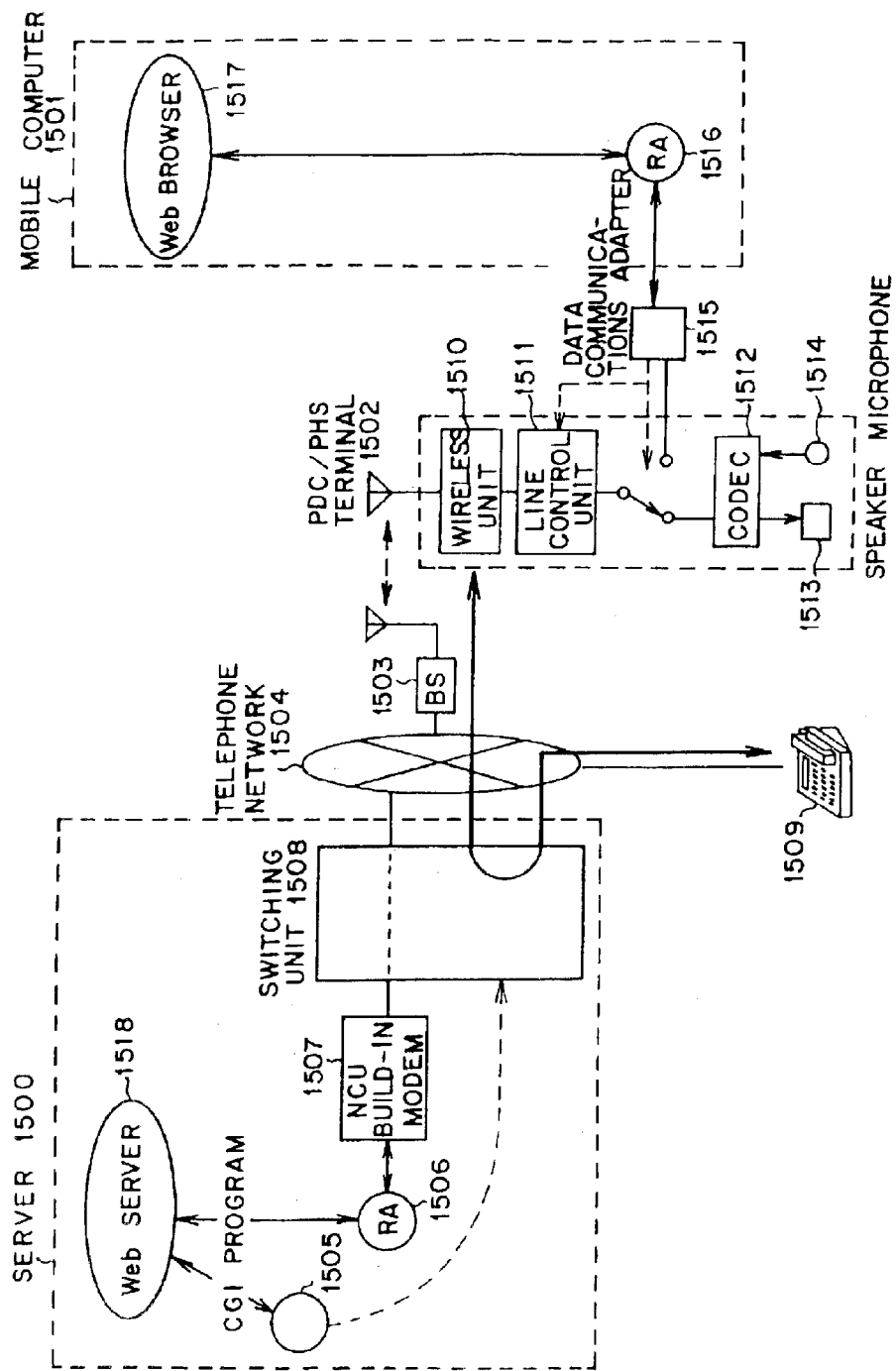
FIG. 16 shows an example of the configuration of the system for temporarily disconnecting data communications and establishing voice communications with a user having no function of data communications, and shows the outline of the configuration in which a switching unit is provided at the server side.

FIG. 16 shows an example of the configuration of the system in which data communications are temporarily disconnected to voice-communicate with a user having no data communications functions. FIG. 16 shows the outline of the configuration including a switching unit on the server side. The system operation shown in FIG. 16 corresponds to the process sequence described by referring to FIG. 4.

A mobile computer 1501 comprising a Web browser 1517 and an RA 1516 (RA client) can be, for example, a small notebook-type personal computer. A user having the mobile computer 1501 accesses a server 1500 using a PDC/PHS terminal 1502. The PDC/PHS terminal 1502 is connected to the mobile computer 1501 through a data communications adapter 1515 (the data adapter 527 shown in FIG. 3). The data communications adapter 1515 controls a line control unit 1511 of the PDC/PHS terminal 1502 to switch between the data communications using the mobile computer 1501 and the voice communications using a speaker 1513 and a microphone 1514. A wireless unit 1510 receives information, etc. from the server 1500 transmitted through a base station 1503 of the PDC/PHS, and transmits information input to the PDC/PHS terminal 1502 through electric waves.

The server 1500 comprises a CGI program 1505; an RA 1506 (RA server); an NCU-built-in modem 1507; a Web server 1518, and a switching unit 1508. It establishes the data communications with the mobile computer 1501, and the voice communications, etc. through the PDC/PHS terminal 1502.

Assume that the user accessing the Web server 1518 through the Web browser 1517 detects the telephone number of a telephone 1509, tries to make a phone call, and clicks the mouse button for the icon of the telephone number. The process is performed in the sequence shown in FIG. 10, and the line control unit 1511 of the PDC/PHS terminal 1502 switches the internal connection from the data communications adapter 1515 side to a CODEC 1512 side. The CODEC 1512 encodes a voice signal input from the microphone 1514 and decodes voice data input through the line control unit 1511 into a voice signal for output to the speaker 1513.

Thus, the PDC/PHS terminal 1502 enters a voice communications state, and can communicate with the telephone 1509 through the switching unit 1508 under control of the server 1500.

FIG. 17 shows an example of the configuration of the system when data communications are temporarily disconnected to voice-communicate with a user having no data communications functions. In this configuration, a switching unit having a 3-point connection is provided in addition to a server. The operation of the system shown in FIG. 17 corresponds to the process sequence shown in FIG. 5.

In FIG. 17, if a component is assigned the same reference number as the component shown in FIG. 16, it indicates that these components are identical. The CGI program is not provided in the server 1500, but it can be provided as shown in FIG. 16.

In FIG. 17, a switching unit 1600 can be in a telephone network 1504 or can be adjacent to the server 1500. The switching unit 1600 is designed to have a 3-point connection function. As shown in FIG. 5, when a voice communications line is connected from the PDC/PHS terminal 1502 to the telephone 1509, the data communications line between the server 1500 the mobile computer 1501 is temporarily disconnected. Then, a voice communications line is connected from the server 1500 side to the PDC/PHS terminal 1502 through the switching unit 1600, and the line is temporarily held in an on-hook state. The server 1500 establishes the voice communications line, and the 3-point connection can be established among the PDC/PHS terminal 1502, the telephone 1509, and the server 1500.

In FIG. 5, the line of the server 1500 is disconnected to hold the line between the PDC/PHS terminal 1502 and the telephone 1509. However, as described by referring to FIG. 5, the 3-point connection line can be set active. Thus, using the 3-point connection function of the switching unit 1600, a phone call can be made from the server 1500 and the PDC/PHS terminal 1502 to the telephone 1509 having no data communications function.

Figure 18:
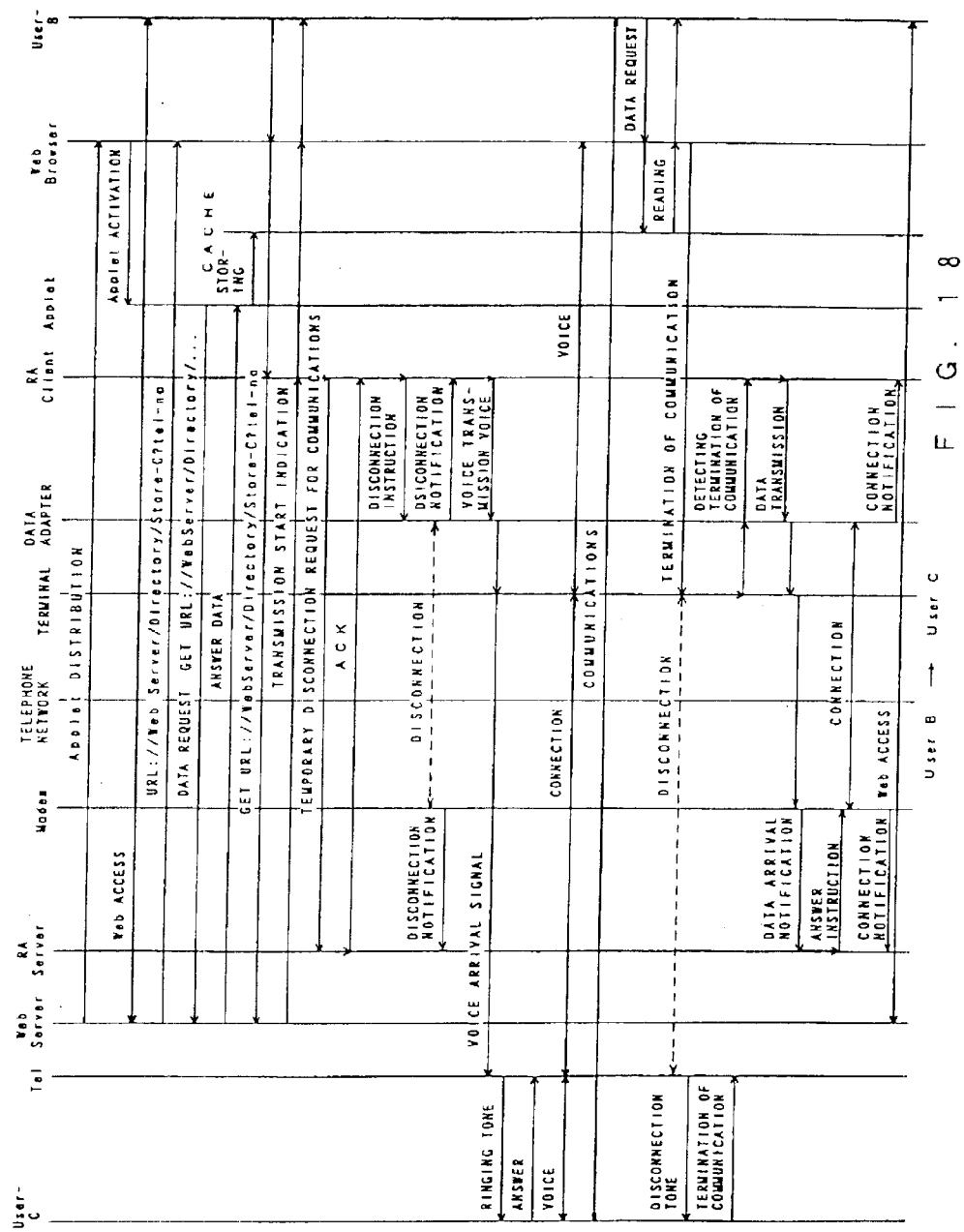
FIG. 18 shows the sequence of the process according to another embodiment of the present invention.

FIG. 18 shows the sequence of the process according to another embodiment of the present invention. According to the present embodiment, the data in a linked-to (destination) point from the home page displayed immediately before disconnecting data communications is preliminarily read in the cache memory. The data in the linked-to point can be displayed by a user's selecting the link through a Web browser even during the voice communications.

When the user B accesses the Web server through the Web browser, an applet for retrieving the data in a linked-to point and storing the data in cache memory is distributed from the Web server to the Web browser of the user B so that the applet can be activated when Web access is gained.

Assume that the user B accesses the Web server through the Web browser, and a home page at an address is opened. The applet issues a data request to a Web server to fetch the data in the linked-to point which is expected to be linked to by the user. In response to the request from the Web server, the applet stores the data in the linked-to point transmitted from the Web server in the cache memory of the terminal (for example, a mobile computer) of the user B. The scope of the data fetched by the applet can be, for example, set to obtain all data in the linked-to point not accessed yet on the displayed home page.

If a request is issued to the Web browser to obtain information containing the telephone number of the user C to allow the user B to voice-communicate with the user C (indicated by 'GET URL://WebServer/Directory/Store—C?tel—no'), then information is transmitted from the Web server with the telephone number set in the special character string (?tel—no=), and the Web browser displays that the transmission for the voice communications is performed. At this time, the RA client issues to the RA server a request to temporarily disconnect the line to establish voice communications. When the RA server transmits an acknowledgement message (ACK) to the RA client, the RA client issues a disconnection instruction to the data adapter.

Thus, the connection between the modem and the data adapter is disconnected, and a disconnection notification is transmitted from the modem to the RA server and from the data adapter to the RA client. Upon receipt of the disconnection notification, the RA client performs a voice call transmission to the phone Tel of the user C, and the phone Tel outputs a ringing tone upon receipt of the arrival of a voice call. If the user C answers the ringing tone, the line is connected between the terminal and the phone Tel, thereby realizing the voice communications between the users B and C.

If the user B issues a data request when the voice communications line is connected, the Web browser refers to the cache memory, reads data, and presents the data to the user B. At this time, if the user B selects the data in a linked-to point but not in the cache memory, then the data cannot be fetched and the Web browser appears suspended in a data fetching state.

The voice communications can be terminated by either the user B or the user C. In FIG. 18, the user B terminates the voice communications. Thus, the line between the terminal (portable phone, etc.) and the phone Tel is disconnected, and a disconnection tone is output from the phone Tel of the user C. When the user C terminates the communications by, for example, setting the receiver of the phone Tel, the voice communications between the user B and the user C terminate.

If the RA client detects that the user B performs a terminating process, the RA client transmits a data call to the RA server. When the RA server receives a data call arrival notification from the modem, the RA server issues an answer instruction to the modem, and a line is connected again between the modem and the data adapter. The modem and the data adapter transmit a connection notification to the RA server and the RA client respectively, and the Web access is resumed. At this time, since the sessions of the Web browsers and the Web servers are set active, the Web access is resumed by the data fetch if the data has not been fetched yet according to the data request from the user B during the voice communications.

FIG. 19 shows the first example of the configuration of the system for following the sequence shown in FIG. 18.

An application 1800 corresponds to a Web browser and an application 1801 corresponds to a Web server. A temporary line disconnection unit 1804 corresponds to an RA client. A temporary line disconnection unit 1810 corresponds to an RA server. A data communications device 1805 corresponds to a data adapter. A data communications device 1809 corresponds to a modem. A terminal 1807 can be a portable telephone, etc. The data storage unit 1803 corresponds to a cache memory. Furthermore, the automatic data fetch unit corresponds to the applet shown in FIG. 18.

The data communications unit 1809 communicates with the terminal 1807 through a telephone network 1806. A telephone 1808 is also connected to the telephone network 1806. When the user on the mobile computer side is accessing the application 1801 on the fixed computer side using the application 1800, a automatic data fetch unit 1802 issues a data fetch command to the application 1801 to fetch necessary data. Necessary data refers to the data in a linked-to point entered in the home page displayed on the application 1800 and which has not been accessed yet.

The data fetched by the automatic data fetch unit 1802 is stored in a data storage unit 1803. When a linked-to point is accessed from the application 1800 during voice communications, the data in the linked-to point is read from the data storage unit 1803, and the data is displayed on the screen through the application 1800.

Thus, during the voice communications between the terminal 1807 on the mobile computer side and the telephone 1808 after the data communications line is disconnected by the temporary line disconnection units 1804 and 1810, the data in the linked-to point stored in the data storage unit 1803 is displayed on the screen. Therefore, the user on the mobile computer feels as if the user were simultaneously voice-communicating and data-communicating.

Virtually, the voice communications and the data communications can be simultaneously performed by the automatic data fetch unit 1802 resident on a mobile computer side.

Figure 20:
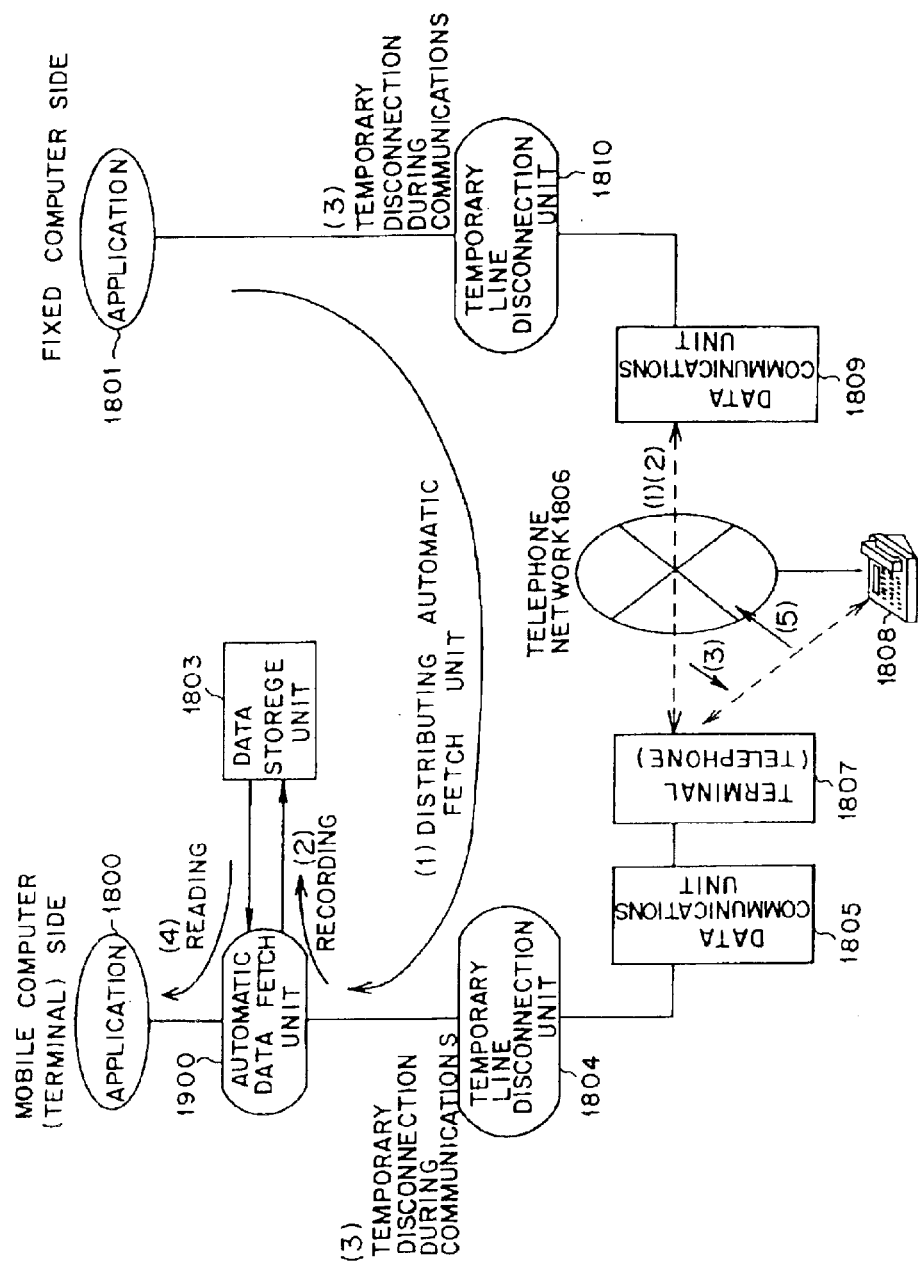
FIG. 20 shows the second example of the configuration of the system for realizing the sequence shown in FIG. 18.

FIG. 20 shows the second example of the configuration of the system which realizes the process sequence shown in FIG. 18.

The components assigned the same reference numbers in FIG. 20 as those in FIG. 19 have the same function. The numbers enclosed by parentheses are the numbers indicating the flow of the processes. First, as shown by (1), assume that data communications have started between the applications 1800 and 1801. Simultaneously, a automatic data fetch unit 1900 is distributed from the application 1801, and the automatic data fetch unit 1900 is resident on the mobile computer side. When the data communications start, the automatic data fetch unit 1900 fetches, from the application 1801, data not accessed from the application 1800 to the application 1801 according to a predetermined rule. As a predetermined rule, for example as described above, data can be fetched from a linked-to point not accessed yet among the linked-to points listed on the home page displayed on the application 1800.

The data fetched as described above is, as indicated by (2), stored in the data storage unit 1803. Then, if voice communications with the telephone 1808 are requested on the mobile computer side, a data communications line connected to the temporary line disconnection units 1804 and 1810 is disconnected as indicated by (3), and the terminal 1807 and the telephone 1808 are connected through a line. When a data transmission request is issued from the application 1800 for the data in a linked-to point during the voice communications, the data storage unit 1803 is retrieved as indicated by (4). If the corresponding data is stored, the data is displayed on the screen by the application 1800. If the corresponding data is not stored as described above, the application 1800 enters a standby state.

When the voice communications with the telephone 1808 have terminated, the line temporarily disconnected by the temporary line disconnection units 1804 and 1810 between the mobile computer and the fixed computer is reconnected as indicated by (5).

Figure 21:
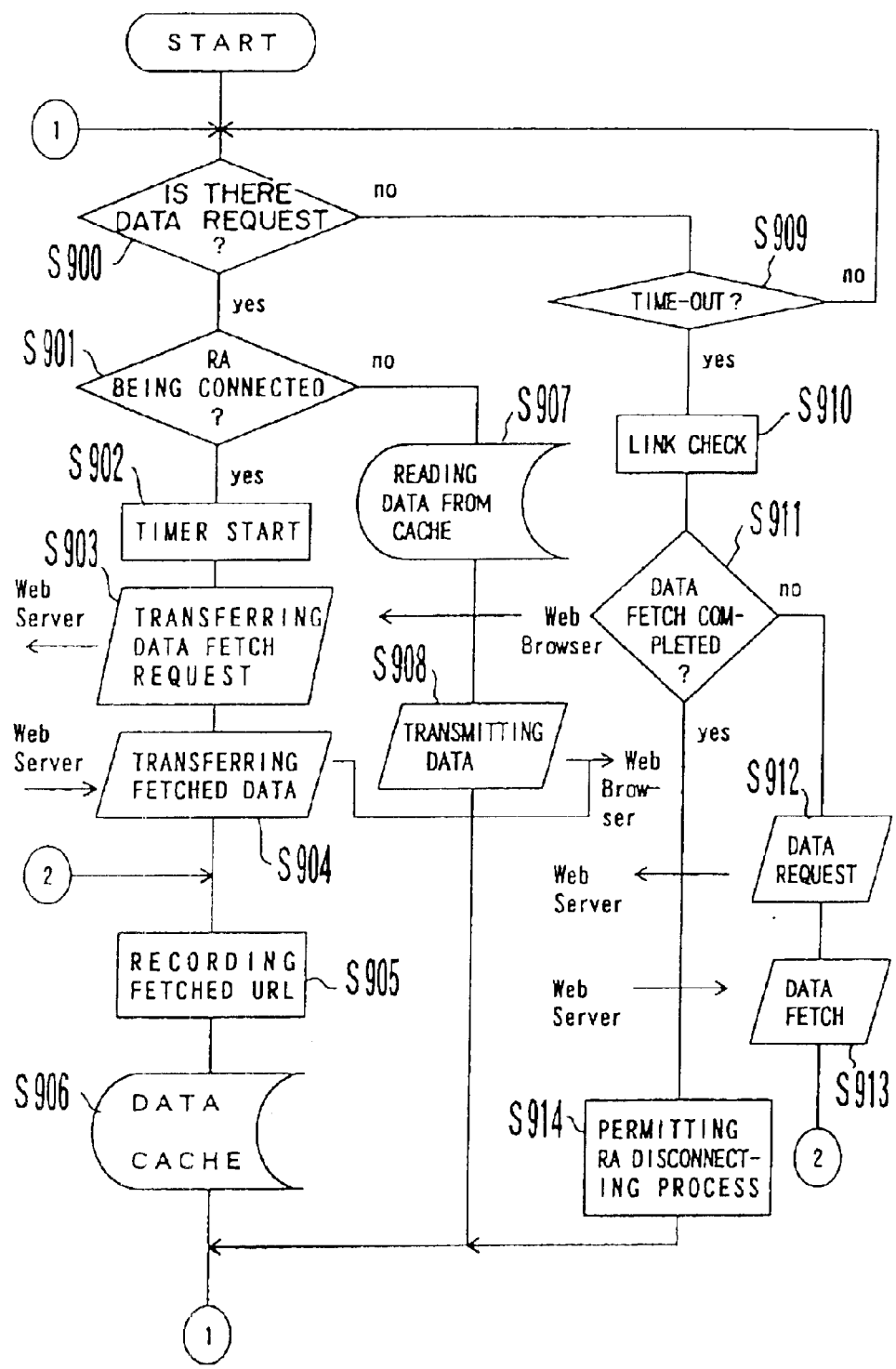
FIG. 21 shows the process flow of an automatic data fetching unit (applet).

FIG. 21 shows the process flow of the automatic data fetch unit (applet).

First, it is determined whether or not the user has issued a data request through the application or the Web browser. If a data request has been issued, it is determined in step S901 whether or not the RA (Client) is connected to the Web server (RA server). If the RA is connected to the Web server, then a timer starts in step S902. In step S903, a request to fetch data specified by the data request is accepted from the Web browser, and the data fetch request is transferred to the Web server. When the data is fetched from the Web server in step S904, it is transferred to the Web browser and displayed on the screen. The address (URL) of the fetched data is recorded (step S905), the data fetched in step S906 is stored in the cache memory, and processing is returned to the start of the process in preparation for the subsequent process.

If it is determined in step S901 that the RA is not connected to the server, then the data stored by the cache memory is read in step S907, and transmitted to the Web browser in step S908. Then, processing is returned to the start of the process in preparation for the subsequent process.

When no data requests are issued in step S900, it is determined in step S909 whether or not the timer activated in step S902 times out. This is to autonomously start the process of fetching data by the automatic data fetch unit after a predetermined time from the first data request. If the timer has not timed-out yet, processing is returned to step S900, that is, to the start of the process in preparation for the subsequent process.

If the time-out has been detected in step S909, then the link currently displayed on the Web browser is checked. In step S911, it is determined whether or not the data in the linked-to point fetched by the check has already been fetched. If it has already been fetched, then a data communications line disconnecting process by the RA is permitted to establish the voice communications in step S914. Then, processing is returned to the start of the process in preparation for the subsequent process.

If it is determined that the data in the linked-to point fetched in step S911 has not been fetched, then a data request is issued to the Web server in step S912, and data is fetched from the Web server in step S913. Then, in step S905, the address (URL) of the linked-to point from which data has been fetched is recorded. In step S906, the fetched data is stored in the cache memory. Then, processing is returned to the start of the process in preparation for the subsequent process.

As described above, voice communications are established during data communications through a single line according to the present invention. When the voice communications terminate, the data communications can be automatically resumed from the state immediately before the start of the voice communications.

By fetching the data in the linked-to point not accessed by the user during the data communications, the user can perform a terminal operation in such a way that the data communications access can be gained through a line while the line is used for the voice communications.

What is claimed is:

1. A terminal communicating with a server through a communications network, comprising:

a temporary line disconnection unit, monitoring a content of received data from the server, and when specified data is received, disconnecting a line being used for data communications without issuing any disconnection notifications to an upper layer application of the terminal when said terminal voice communicates with a third party other than the server through said communication network during the data communications with the server, and automatically connecting the server to the terminal when the voice communications terminate;

an automatic data fetch unit automatically fetching data of web sites including information requested by a user from the server to the terminal, and wherein said automatic data fetch unit includes means for fetching, from the server, data which is not being accessed by the upper layer application and which is linked from a website that the user is viewing, and for storing the obtained data during the data communications with the server, and means for passing the stored data to the upper layer application during the voice communications with the third party when the user selects the link to the website corresponding to the stored data; and a storage unit storing the data fetched by said automatic data fetch unit, wherein a data communicating process is performed from a status at a point immediately before starting the voice communications when the server and the terminal resume the data communications.

2. The terminal according to claim 1, wherein said terminal obtains a telephone number of the third party as information during the data communications.

3. The terminal according to claim 1, wherein said temporary line disconnection unit temporarily disconnects a line between said server and said terminal when said terminal issue a voice communications request to the third party, connecting a telephone switch unit which is provided in the server to telephones of the third party and said terminal, connecting two calls on a server side, thereby realizing voice communications between said terminal and the third party.

4. The terminal according to claim 3, wherein the server temporarily disconnects the line between said terminal and said server when said terminal issues a request for voice communications with third party to said server; and said server, a telephone of said third party, and said terminal enter a 3-point communications state base on a 3-point communications function of said telephone switch unit, thereby realizing the voice communications between said terminal and said third party.

5. The terminal according to claim 1, wherein said temporary line disconnection unit temporarily disconnects the line when said terminal issues a request for voice communications with the third party to said server; and said terminal issues a voice communications call to the third party, thereby realizing the voice communications between said terminal and said third party.

6. The terminal according to claim 1, wherein said temporary line disconnection unit temporarily disconnects a line between said terminal and said server according to an instruction from a first unit which is provided in the server and which manages personal information and communications status of each user, when said terminal issues a request for voice communications with the third party to said server;

said terminal issues a call through the voice communications to the third party, thereby realizing voice communications between said terminal and said third party, wherein the server has an object which manages personal information, and the object communicates with other object which is in said terminal and also manages personal information, before communication by the user, thereby said terminal can receive a call.

7. The terminal according to claim 1, further comprising:
a unit receiving said automatic data fetch unit, wherein
said automatic data fetch unit is transmitted from a server side to the terminal side when the data communications start.

8. A terminal communicating with a server through a communications network, comprising:

a temporary line disconnection unit monitoring a content of received data from the server and from the terminal, and when specified data is received, disconnecting a line being used for data communications without issuing any disconnection notifications to an upper layer application of the terminal when said terminal voice communicates with a third party other than the server through said communications network during the data communications with the server, and automatically connecting the server to the terminal when the voice communications terminate, means for fetching from the server data which is not being accessed by the upper layer application in the terminal and which is linked from a website that the user is viewing, and storing the fetched data during the data communications, and means for passing the stored data to the upper layer application in the terminal during the voice communications with the third party when the user selects the link to the website corresponding to the stored data, wherein a data communicating process performed from a status at a point immediately before starting the voice communications when the server and the terminal resume the data communications.

9. The terminal according to claim 8, wherein
said terminal obtains a telephone number of the third party as information during the data communications.

10. The terminal according to claim 8, wherein
said temporary line disconnection unit temporarily disconnects a line between said server and said terminal when said terminal issues a voice communications request to the third party, connecting a telephone switch unit which is provided in the server to telephones of the third party and said terminal, connecting two calls on a server side, thereby realizing voice communications between said terminal and the third party.

11. The terminal according to claim 10, wherein
the server temporarily disconnects the line between said terminal and said server when said terminal issues a request for voice communications with third party to said server; and
said server, a telephone of said third party, and said terminal enter a 3-point communications state based on a 3-point communications function of said telephone switch unit, thereby realizing the voice communications between said terminal and said third party.

12. The terminal according to claim 8, wherein
said temporary line disconnection unit temporarily disconnects the line when said terminal issues a request for voice communications with the third party to said server; and
said terminal issues a voice communications call to the third party, thereby realizing the voice communications between said terminal and said third party.

13. The terminal according to claim 8, wherein
said temporary line disconnection unit temporarily disconnects a line between said terminal and said server according to an instruction from a first unit which is provided in the server and which manages personal information and communications status of each user, when said terminal issues a request for voice communications with the third party to said server;
said terminal issues a call through the voice communications to the third party, thereby realizing voice communications between said terminal and said third party,
wherein the server has an object which manages personal information, and the object communicates with another object which is in said terminal and also manages personal information, before communication by the user, thereby said terminal can receive a call.

14. The terminal according to claim 8, further comprising:
a unit receiving said automatic data fetch unit, wherein
said automatic data fetch unit is transmitted from a server side to the terminal side when the data communications start.

15. A terminal communicating with a server through a communications network, comprising:

a temporary line disconnection unit, monitoring a content of received data from the server, and when specified data is received, disconnecting a line being used for data communications without issuing any disconnection notifications to an upper layer application of the terminal when said terminal voice communicates with a third party other than the server through said communication network during the data communications with the server, and automatically connecting the server to the terminal when the voice communications terminate;

an automatic data fetch unit automatically fetching data of web sites including information requested by a user from the server to the terminal; and a storage unit storing the data fetched by said automatic data fetch unit, wherein a data communicating process is performed from a status at a point immediately before starting the voice communications when the server and the terminal resume the data communications, wherein said automatic data fetch unit fetches information including the telephone number of the third party from the server during data communication with the server for conducting the voice communications, and wherein said automatic data fetch unit preliminarily fetches the data obtainable from the server which is not being accessed by the upper layer application and which is linked from a website that the user is viewing, and stores the data in said storage unit during the data communications, and accesses said storage unit during the voice communications when the user selects the link to the website corresponding to the stored data, so that the data in said storage unit is displayed during the voice communication, thereby realizing virtual data communications during the voice communications.

16. A terminal communicating with a server through a communications network, comprising:

a temporary line disconnection unit monitoring a content of received data from the server and from the terminal, and when specified data is received, disconnecting a line being used for data communications without issuing any disconnection notifications to an upper layer application of the terminal when said terminal voice communicates with a third party other than the server through said communications network during the data communications with the server, and automatically connecting the server to the terminal when the voice communications terminate, an automatic data fetch unit automatically fetching data of web sites including information requested by a user from the server to the terminal;

a storage unit storing the data fetched by said automatic data fetch unit; and means for obtaining information including a telephone number of the third party from the server during the data communications with the server for conducting the voice communications between the terminal and the third party, wherein a data communicating process is performed from a status at a point immediately before starting the voice communications when the server and the terminal resume the data communications;

wherein said automatic data fetch unit preliminarily fetches the data obtainable from the server which is not being accessed by the upper layer application and which is linked from a website that the user is viewing, and stores the data in said storage unit during the data communications, and accesses said storage unit during the voice communications when the user selects the link to the website corresponding to the stored data, so that the data in said storage unit is displayed during the voice communication, thereby realizing virtual data communications during the voice communications.

* * * * *